(12) United States Patent
Jeong et al.

(10) Patent No.: US 9,681,187 B2
(45) Date of Patent: Jun. 13, 2017

(54) METHOD FOR CONTROLLING BROADCAST RECEIVING DEVICE

(71) Applicant: LG ELECTRONICS INC., Seoul (KR)

(72) Inventors: Woojin Jeong, Seoul (KR); Donghee Lee, Seoul (KR); Jaeug Lew, Seoul (KR); Eunkyung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/541,206

(22) Filed: Nov. 14, 2014

(65) Prior Publication Data

US 2015/0373411 A1    Dec. 24, 2015

(30) Foreign Application Priority Data

Jun. 24, 2014  (KR) .................. 10-2014-0077614
Jul. 31, 2014  (KR) .................. 10-2014-0098415

(51) Int. Cl.
| | | |
|---|---|---|
| H04N 21/458 | (2011.01) | |
| H04N 21/462 | (2011.01) | |
| H04N 21/433 | (2011.01) | |
| H04N 21/435 | (2011.01) | |
| H04N 21/482 | (2011.01) | |
| H04N 21/61 | (2011.01) | |
| H04N 21/84 | (2011.01) | |
| H04N 21/854 | (2011.01) | |
| H04H 60/72 | (2008.01) | |
| H04H 60/82 | (2008.01) | |

(52) U.S. Cl.
CPC ........ *H04N 21/4622* (2013.01); *H04H 60/72* (2013.01); *H04H 60/82* (2013.01); *H04N 21/435* (2013.01); *H04N 21/4334* (2013.01); *H04N 21/4355* (2013.01); *H04N 21/4583* (2013.01); *H04N 21/4586* (2013.01); *H04N 21/482* (2013.01); *H04N 21/4821* (2013.01); *H04N 21/6125* (2013.01); *H04N 21/84* (2013.01); *H04N 21/85406* (2013.01)

(58) Field of Classification Search
USPC .................................... 725/48–49
See application file for complete search history.

(56) References Cited

U.S. PATENT DOCUMENTS

| | | | | |
|---|---|---|---|---|
| 2003/0051246 A1* | 3/2003 | Wilder | ............... | H04N 5/44543 725/49 |
| 2008/0046929 A1* | 2/2008 | Cho | ................... | H04N 7/17318 725/46 |
| 2008/0273856 A1* | 11/2008 | Bumgardner | .......... | H04N 5/782 386/292 |
| 2015/0003814 A1* | 1/2015 | Miller | ................ | H04N 21/4583 386/297 |

FOREIGN PATENT DOCUMENTS

| | | |
|---|---|---|
| EP | 2611204 A1 | 7/2013 |
| JP | 2007-102489 A | 4/2007 |
| WO | 2011/033671 A1 | 3/2011 |

* cited by examiner

*Primary Examiner* — Pankaj Kumar
*Assistant Examiner* — Charles N Hicks
(74) *Attorney, Agent, or Firm* — Dentons US LLP

(57) ABSTRACT

A method for controlling a broadcast receiving device includes receiving a first electronic program guide (EPG) via a broadcasting network via and a second EPG via the Internet, and combining first broadcast-related information generated from the first EPG and second broadcast-related information generated from the second EPG to generate and output third broadcast-related information.

19 Claims, 23 Drawing Sheets

FIG. 3

| broadcast guide | | | | |
|---|---|---|---|---|
| 7-1 KBS2 HD | | | | 2014/01/13 14:57 PM |
| whole channel | 1/13 Monday | | | |
| | ▼ 15:00 | | | 16:00 |
| 6-1 SBS HD | I see hometown | genuine Korea's taste | | 2013 Korean |
| 7-1 KBS2 HD | Quiz show | buzz-buzz | hooters | TV kindergarden |
| 9-1 KBS1 HD | TV gallery | Testimony of 4.19 ge... | | 4 o'clock... |
| 10-1 EBS DTV | For foreigners... | pororo | kkemi | dingdongdaeng |
| 11-1 MBC DTV | unification... | MBC network special | | Father, whe... |

(a) EPG-based broadcast-related information according to prior art

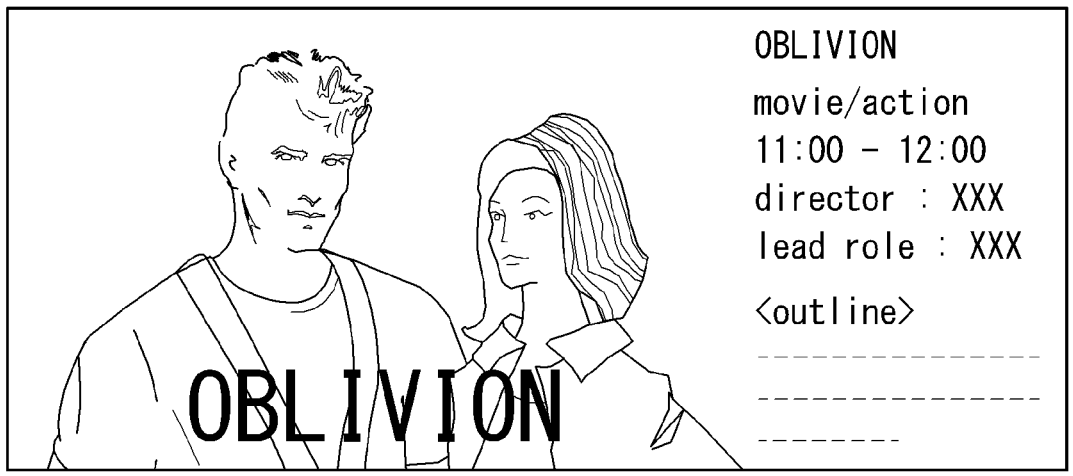

(b) EPG-based broadcast-related information according to present invention

FIG. 6

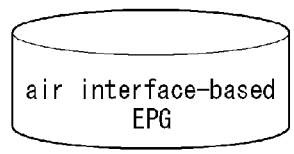
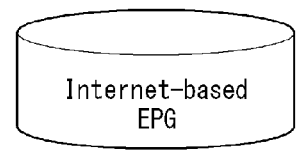

Korea
- Coverage : major digital terrestrial channel
- availability information : program title/start time/end time/(very partial amount of) description

<

- Coverage : every channel (digital+analog)
- availability information : ProgramID/Thumbnail/program title/start time/end time/genre/season/episode actor/director/...

US
- Coverage : very low (negligible)

<

- Coverage : terrestrial digital channel there are variations in area/signal strength, etc.
- availability information : ProgramID/Thumbnail/program title/start time/end time/genre/season/episode actor/director/...

Europe
- Coverage : digital terrestrial/satellite/cable(variations in environments of countries are significant
- availability information : program title/start time/end time/.../genre information

<

- Coverage : digital terrestrial/satellite/cable(variations in environments of countries are significant)
- availability information : program title/start time/end time/genre/season/episode/actor/director...
→ variations in richness are significant

| broadcast guide | | | | |
|---|---|---|---|---|
| | K-POP STAR | | PM 4:35 | |
| | (EMPTY) | | | |
| | 6/23 (SUN) | | | |
| | 16:00 | 16:30 | 17:00 | 17:30 |
| 6-1 SBS HD | ▶ SBS NEWS | | K-POP STAR | |
| 7-1 KBS2 HD | no program information | | | |
| 9-1 KBS1 HD | no program information | | | |
| 10-1 EBS DTV | no program information | | | |
| 11-1 MBC DTV | no program information | | | |

153 — K-POP STAR
154 — PM 4:35
155 — (EMPTY) row
156 — channel grid (b)

| broadcast guide | | | | K-POP STAR |
|---|---|---|---|---|
| | K-POP STAR [LIVE] | | PM 4:50 | |
| | [K-POP STAR] The audition program that... | | | |
| | 6/23 (SUN) | | | |
| | 16:00 | 16:30 | 17:00 | 17:30 |
| 6-1 SBS HD | ▶ SBS NEWS | | K-POP STAR | |
| 7-1 KBS2 HD | WALKING DEAD 1 | | WALKING DEAD 2 | |
| 9-1 KBS1 HD | HAPPY SUNDAY | | KOREAN HISTORY-WAR | |
| CATV 24-1 ONT | FOOTBALL | | BASEBALL<LG:NY> | |
| CATV 26-1 KTV | HOME SHOPPING | | DR. CONCERT | |

| byte | 00 | 01 | 02 | 03 | 04 | 05 |
|---|---|---|---|---|---|---|
| text | C | O | S | M | O | S |
| hex | 43 | 4F | 53 | 4D | 4F | 53 |

(b)

| byte | 00 | 01 | 02 | 03 | 04 | 05 | 06 | 07 | 08 | 09 |
|---|---|---|---|---|---|---|---|---|---|---|
| text | [ | H | D | ] | C | O | S | M | O | S |
| hex | 5B | 48 | 44 | 5D | 43 | 4F | 53 | 4D | 4F | 53 |

(c)

| byte | 00 | 01 | 02 | 03 | 04 | 05 | 06 | 07 | 08 | 09 | 10 | 11 |
|---|---|---|---|---|---|---|---|---|---|---|---|---|
| text | C | O | S | M | O | S | [ | L | I | V | E | ] |
| hex | 43 | 4F | 53 | 4D | 4F | 53 | 5B | 4C | 49 | 56 | 45 | 5D |

FIG. 17

| | title | start time | end time | time difference | matching |
|---|---|---|---|---|---|
| first broadcast-related information | ABC NEWS | 07:00 | 08:00 | - | O |
| second broadcast-related information | ABC NEWS SPECIAL | 07:10 | 08:10 | 20 min | O |
| | XYZ NEWS | 07:00 | 07:30 | 30 min | - |

|  | title | start time | end time | time difference | matching |
|---|---|---|---|---|---|
| first broadcast-related information | COSMOS | 07:00 | 08:00 | - | O |
| second broadcast-related information | ABC NEWS | 07:00 | 08:10 | 10 min | - |
| | [HD]COSMOS | 07:10 | 08:10 | 20 min | O |

FIG. 25
(a)
(b)
(c)

FIG. 26

METHOD FOR CONTROLLING BROADCAST RECEIVING DEVICE

CROSS-REFERENCE TO RELATED APPLICATIONS

Pursuant to 35 U.S.C. §119(a), this application claims the benefit of earlier filing date and right of priority to Korean Patent Application No. 10-2014-0077614, filed on Jun. 24, 2014, and No. 10-2014-0098415, filed on Jul. 31, 2014, the contents of each are incorporated by reference herein in their entireties.

TECHNICAL FIELD

The present disclosure relates to a method for controlling a broadcast receiving device, and more particularly, to a method for controlling a broadcast receiving device capable of providing various types of broadcast-related information for users.

BACKGROUND

Currently, a majority of countries provide broadcast signals and electronic program guides (EPG) as additional information corresponding to broadcast signals via an over-the-air interface. Such EPGs provided via the over-the-air interface (hereinafter, referred to as "air interface-based EPG") are limited in capacity, for example a limitation in providing various types of broadcast-related information.

Thus, an EPG providing services that generate an EPG including richer broadcast-related information with respect to broadcasting channels based on EPG information provided from a broadcasting station, and provide the generated EPG via the Internet has been activated.

SUMMARY

Accordingly, the present invention provides a method for controlling a broadcast receiving device capable of combining broadcast-related information based on an air interface-based electronic program guide (EPG) and a broadcast-related information based on an Internet-based EPG and providing requested broadcast-related information to an application.

The object of the present invention is not limited to the aforesaid, but other objects not described herein will be clearly understood by those skilled in the art from descriptions below.

In one general aspect, a method for controlling a broadcast receiving device may include: receiving, with a communication device, a first electronic program guide (EPG) via a broadcasting network and a second EPG via the Internet; and combining, in a controller, first broadcast-related information generated from the first EPG and second broadcast-related information generated from the second EPG to generate and output third broadcast-related information.

According to at least one of the embodiments of the present invention, more accurate and richer broadcast-related information can be provided to users.

Further aspects of the present invention described above will be clarified through the following embodiments described with reference to the accompanying drawings. It should be appreciated that various modifications and corrections within the concept and scope of the present invention are clearly understood by those skilled in the art, so particular embodiments such as the detailed description and preferred embodiments of the present invention are merely illustrative.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 3 is a view illustrating an example of related art EPG-based broadcast information and an example of broadcast-related information provided by the broadcast receiving device according to an embodiment of the present invention;

FIG. 6 is a view illustrating an example of information included in an air interface-based EPG and information include an Internet-based EPG according to each country;

FIG. 13 is a view illustrating an example of broadcast-related information according to the related art EPG;

FIG. 16 is a view conceptually illustrating an example of matching of broadcast-related information according to titles of broadcast programs by a broadcast receiving device according to another embodiment of the present invention;

FIG. 17 is a view conceptually illustrating an example of matching of broadcast-related information according to a time difference between broadcast programs by a broadcast receiving device according to another embodiment of the present invention;

FIG. 25 is a view illustrating an example of setting reserved recording of a broadcast receiving device according to another embodiment of the present invention;

FIG. 26 is a view illustrating an example of canceling or changing reserved viewing or reserved recording of a broadcast receiving device according to another embodiment of the present invention.

DETAILED DESCRIPTION

The aforementioned objects, features, and advantages of the present invention will become more apparent through the following detailed description with respect to the accompanying drawings. Hereinafter, the embodiments of the present invention will be described with reference to the accompanying drawings, in which like numbers refer to like elements throughout the specification.

Hereinafter, a broadcast receiving device related to the present invention will be described in detail with reference to the accompanying drawings. In the following description, usage of suffixes such as 'module', 'part', or 'unit' used for referring to elements is given merely to facilitate explanation of the present invention, without having any significant meaning by itself.

Figure 1:
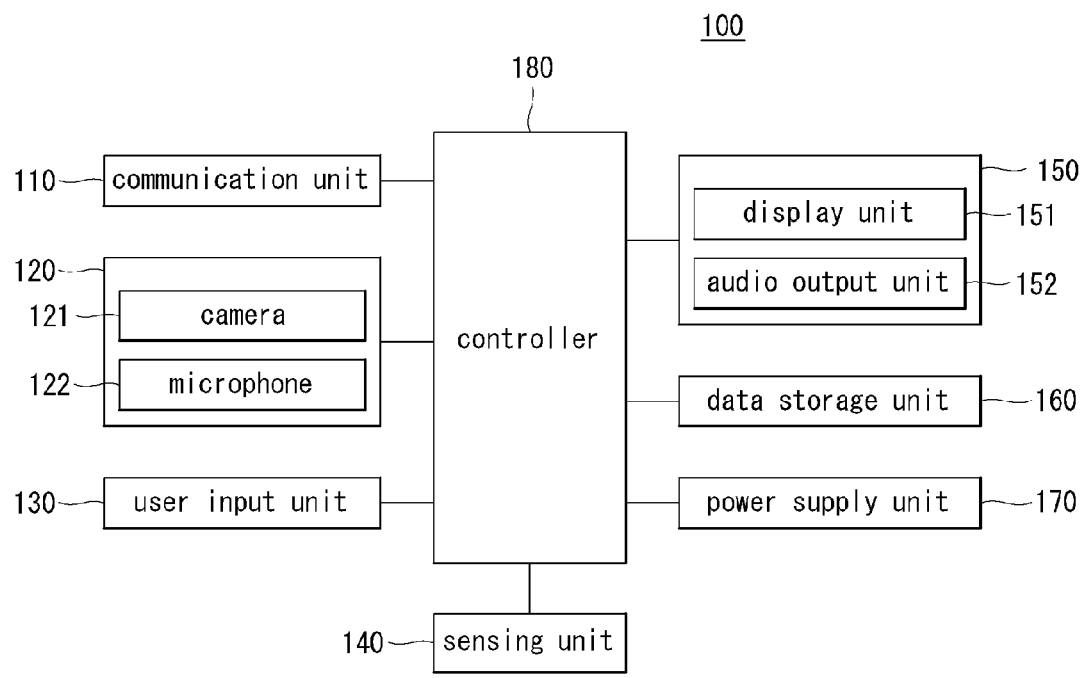
FIG. 1 is a view illustrating an example of a block diagram of a broadcast receiving device according to an embodiment of the present invention.

FIG. 1 is a block diagram of a broadcast receiving device 100 according to an embodiment of the present invention. The broadcast receiving device described in the present disclosure may include stationary electronic devices such as a TV, a PC, a digital signage device, and the like, and a mobile electronic device such as a smartphone, a smart pad, a notebook computer, and the like. However, the present invention is not limited thereto.

Referring to FIG. 1, the broadcast receiving device 100 includes a communication unit 110, an input unit 120, a user input unit 130, a sensing unit 140, an output unit 150, a data storage unit 160, a power supply unit 170, and a controller 180. The components illustrated in FIG. 1 are not a requirement, and the broadcast receiving device 100 may have more or less components. Hereinafter, each of the components will be described.

The communication unit 110 may include one or more modules allowing for wired/wireless communication between the broadcast receiving device 100 and a communication network. For example, the communication unit 110 may include a broadcast receiving module, a mobile communication module, a wired/wireless Internet module, a short-range communication module, and the like. The communication unit 110 may receive various data including a broadcast signal through a communication network.

The input unit 120 obtains an audio signal or a video signal from the outside. As illustrated in FIG. 1, the input unit 120 may include a camera 121, a microphone 122, or the like. The camera 121 processes an image frame of a still image, a video, or the like, obtained by an image sensor in a video call mode or an image capture mode. The microphone 122 receives an external audio signal and processes it into electrical voice data.

The user input unit 130 generates input data for controlling an operation of the broadcast receiving device 100 by a user. The user input unit 130 may include one or more of a keypad, a dome switch, a touch pad (e.g., a touch sensitive member that detects changes in resistance, pressure, capacitance, etc. due to being contacted), a jog wheel, a jog switch, and the like.

The sensing unit 140 may sense the current state of the broadcast receiving device 100 or sense a state of a user, and may sense a state of the surroundings of the broadcast receiving device 100. Data sensed by the sensing unit 140 may be used as a base for controlling an operation of the broadcast receiving device 100.

The output unit 150 may output an image signal and/or an audio signal of content reproduced under the control of the controller 180. As illustrated in FIG. 1, the output unit 150 may include a display unit 151 and an audio output unit 152.

The display unit 151 may display and output information processed in the broadcast receiving device 100. The display unit 151 may be formed as a liquid crystal display (LCD), a thin film transistor-LCD (TFT-LCD), an organic light emitting diode (OLED) display, or a flexible display. The display unit 151 may include a display outputting an image and a polarizing film filtering the image at a predetermined polarizing angle and outputting the same.

Also, the display unit 151 may output an image based on a polarized glass type or a shutter glass type to allow the user to recognize a three-dimensional (3D) stereoscopic image. However, the scheme for forming a 3D stereoscopic image is not limited to the foregoing examples.

The audio output unit 152 outputs an audio signal related to a function performed in the broadcast receiving device 100. The audio output unit 152 may include a receiver, a speaker, a buzzer, and the like. Also, the audio output unit 152 may output a sound through an earphone jack.

The data storage unit 160 may store a program for an operation of the controller 190, and may temporarily or permanently store input/output data. The data storage unit 160 may temporarily or permanently store image data output through the display unit 151 and audio data corresponding thereto.

The data storage unit 160 may store an operating system (OS) required for the broadcast receiving device 100 to operate and various application programs. The data storage unit 160 may temporarily store data generated during an operational process of the broadcast receiving device 100 or data received from the outside. Namely, the data storage unit 160 may include a nonvolatile data storage unit and a volatile data storage unit.

The data storage unit 160 may include implemented storage mediums such as a flash memory type, a hard disk type, a multimedia card micro type, a card type memory (e.g., SD, DX data storage unit, etc.), random access memory (RAM), a static random access memory (SRAM), a read-only memory (ROM), an electrically erasable programmable read-only memory (EEPROM), a programmable read-only memory (PROM), a magnetic data storage unit, a magnetic disk, an optical disk, and the like. Also, the broadcast receiving device 100 may operate in association with a web storage which performs the storage function of the data storage unit 160 on the Internet.

The controller 180 typically controls overall operation of the broadcast receiving device 100. Specifically, the controller 180 may control operations of the components of the broadcast receiving device 100. In one example, the controller 180 may control the display unit 151 and the audio output unit 152 to output an image and a sound based on broadcast data received through the communication unit 110. Also, the controller 180 may temporarily or permanently store various data generated during a broadcast data output process in the data storage unit 160.

The controller 180 may generate various broadcast-related information based on an electronic program guide (EPG) related to a broadcast received through the communication unit 110 and store the generated broadcast-related information in the data storage unit 160 or may provide the stored broadcast-related information for the user through the output unit 150. Here, the broadcast-related EPG may be received through a broadcast network or may be received through the Internet. The function of providing the broadcast-related information of the broadcast receiving device 100 will be described in detail hereinafter.

The controller 180 may include a plurality of lower control units respectively performing a specified function.

The power supply unit 170 may receive external and/or internal power to provide power required for operation of various components under the control of the controller 180.

Various embodiments described herein may be implemented in a computer or similar device readable recording medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions described in the present disclosure may be implemented with separate software modules. Software codes can be implemented by a software application written in any suitable programming language. The software codes may be stored in the data storage unit 160 and executed by the controller 180.

Figure 2:
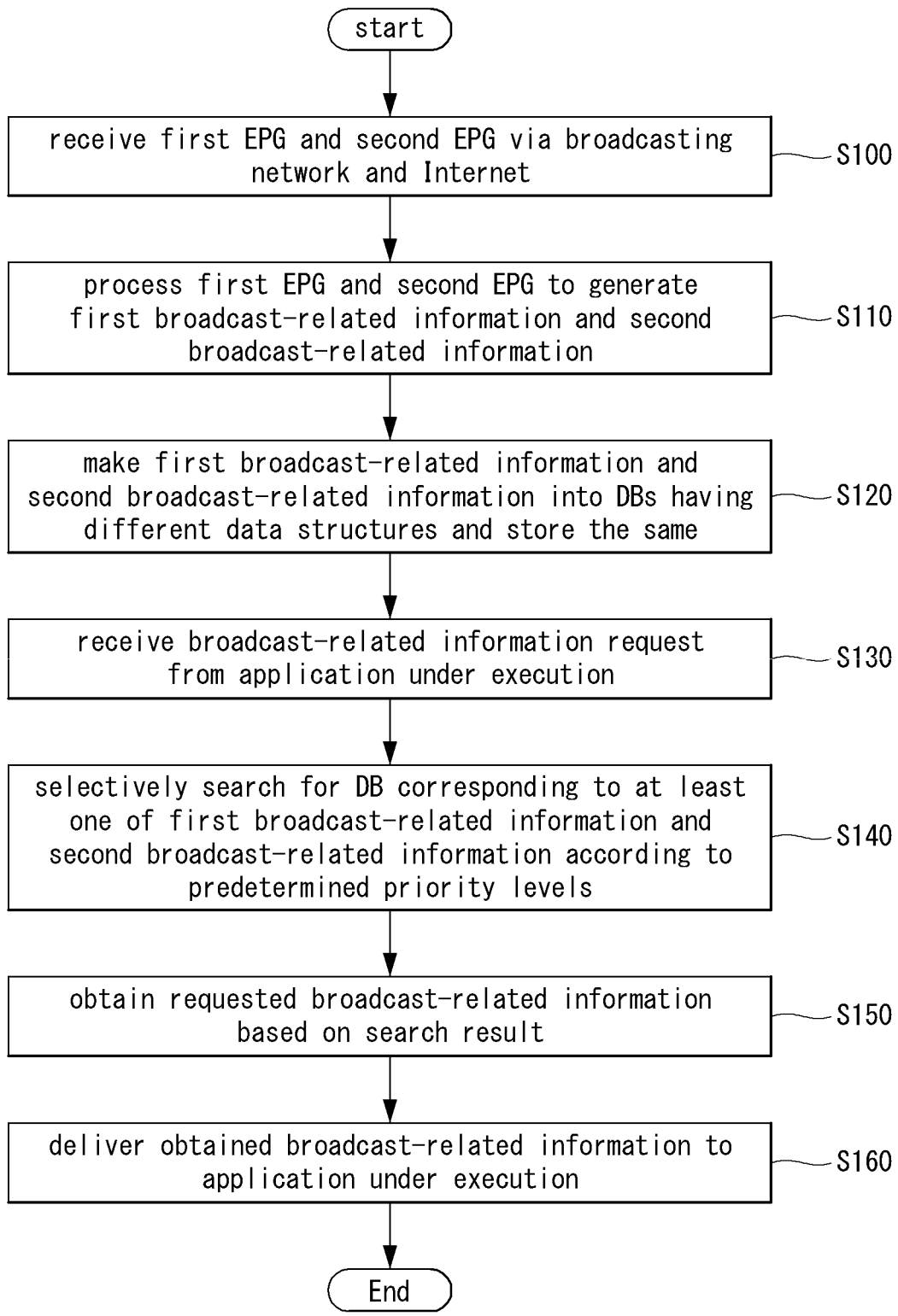
FIG. 2 is a flow chart illustrating an example of a method for driving a broadcast receiving device according to an embodiment of the present invention.

FIG. 2 is a flow chart illustrating an example of a method for driving a broadcast receiving device according to an embodiment of the present invention. Hereinafter, the method for driving a broadcast receiving device will be described with reference to relevant drawings.

First, the communication unit 110 receives a broadcast signal including broadcast data and first broadcast-related EPG information from a broadcast network and receives second broadcast-related EPG information through the Internet (S100). The first EPG may be an EPG provided by a broadcasting station and the second EPG may be an EPG processed based on an EPG provided from a broadcasting station.

For example, the first EPG information may include only relatively simple, low-capacity information such as a program title, a program start and end time, a brief description of a program, and the like. Meanwhile, the second EPG information may include various types of information created by an EPG service provider based on the first EPG information. For example, the second EPG information may include an identifier identifying a program, a thumbnail image of a program, a detailed description of a program, relevant characters such as a director, an actor, or the like, of a program, genre information of a program, a brief video with respect to a program, and the like. However, the present invention is not limited thereto.

When the first and second EPGs are received, the controller 180 processes the first EPG to generate first broadcast-related information and processes the second EPG to generate second broadcast-related information (S110). Thereafter, the controller 180 makes the first and second broadcast-related information into DBs each having a different data structure, and stores the same in the data storage unit 160 (S120). Here, the first and second broadcast-related information may be stored in a portion of a nonvolatile storage unit of the data storage unit 160.

In a state in which the first and second broadcast-related information are stored in the data storage unit 160, a broadcast-related information request is received from an application being executed in the broadcast receiving device 100 (S130). Then, the controller 180 selectively searches a DB corresponding to at least one of the first and second broadcast-related information according to predetermined priorities (S140), and obtains the requested broadcast-related information based on the search result (S150).

Here, as for priorities of the first and second broadcast-related information, the first broadcast-related information may have a higher priority, the second broadcast-related information may have a higher priority, or the first and second broadcast-related information may have the same priority. When the first broadcast-related information has a higher priority, the controller 180 may search for only the DB corresponding to the first broadcast-related information (namely, the DB storing the first broadcast-related information) to obtain the requested broadcast-related information. On the contrary, when the priorities of the first and second broadcast-related information are equal, the controller 180 may search for all the DBs corresponding to the first and second broadcast-related information to obtain the requested broadcast-related information.

Meanwhile, the priorities of the first and second broadcast-related information may be determined in advance according to requested broadcast information or may be determined in advance according to applications which have requested broadcast-related information. Also, priorities of the first and second broadcast-related information may be determined in advance according to countries in which the broadcast receiving device 100 is being driven.

In another example, priorities of the first and second broadcast-related information may be determined in advance depending on whether the broadcast-related information requested by the application is included in the first and second broadcast-related information. For example, as for a thumbnail image relating to a program, broadcast-related information, that cannot be generated based on the first EPG received through a broadcast signal but can be generated based on a second EPG received through the Internet, a priority of the second broadcast-related information may be higher all the time. Namely, in a case in which particular broadcast-related information not included in the first broadcast-related information but included only in the second broadcast-related information is requested by an application, the controller 180 may search only the DB storing the second broadcast-related information to obtain the requested broadcast-related information.

When the requested broadcast-related information is obtained, the controller 180 delivers the obtained broadcast-related information to the application being executed (S160). Then, the application being executed may execute a predetermined operation using the received broadcast-related information.

For reference, in the present disclosure, for an EPG received through the broadcasting network, the first EPG and an air interface-based EPG will be used together, and for an EPG received through the Internet, the second EPG and an Internet-based EPG will be used together.

FIG. 3 is a view illustrating an example of related art EPG-based broadcast information and an example of broadcast-related information provided by the broadcast receiving device according to an embodiment of the present invention.

Referring to (a) of FIG. 3, it can be seen that the related art broadcast receiving device simply provides only channel information and program schedule information regarding each channel. Referring to (b) of FIG. 3, it can be seen that the broadcast receiving device 100 according to an embodiment of the present disclosure additionally provides an image corresponding to a program together with basic information regarding the program, genre information of the program, program-related character information, a summary of the program, and the like.

Although not shown, the broadcast receiving device 100 according to an embodiment of the present disclosure may basically provide program schedule information of each channel illustrated in (a) of FIG. 3. When a particular program is selected from the program schedule information of each channel, additional information regarding the selected program as illustrated in (b) of FIG. 3 may be provided.

Figure 4:
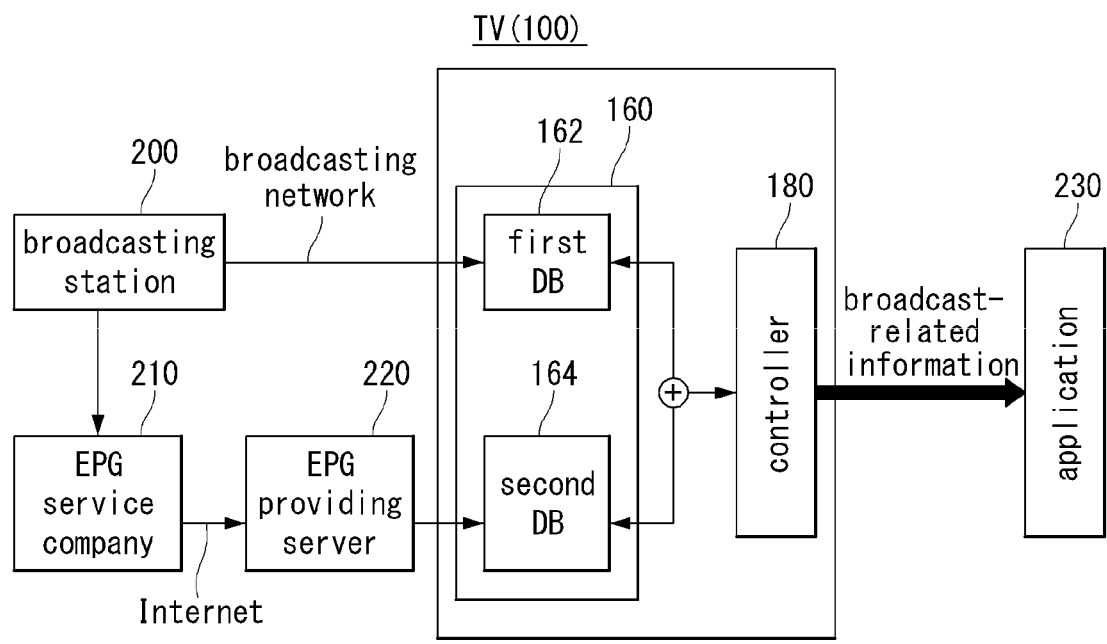
FIG. 4 is a view illustrating an example illustrating a process of delivering broadcast-related information to an application based on EPG received via a heterogeneous network in a TV, a type of broadcast receiving device according to an embodiment of the present invention.

FIG. 4 is a view illustrating an example illustrating a process of delivering broadcast-related information to an application based on EPG received via a heterogeneous network in a TV 100, a type of broadcast receiving device 100 according to an embodiment of the present invention. In FIG. 4, only components required for the processing of generating and delivering broadcast-related information among the components of the TV 100 are illustrated.

A broadcasting station 200 transmits a first EPG (a basic EPG provided by the broadcasting station) through a broadcasting network. Then, the TV 100 receives the first EPG and stores the received first EPG in a first DB 162 of the data storage unit 160. Although not shown, the TV 100 may process the received first EPG to have a predetermined data structure and store the same.

The first EPG is delivered to an EPG service provider 210 which, upon receiving the first EPG, processes the first EPG and provides the same. The EPG service provider 210 generates a second EPG with various types of broadcast-related information added thereto based on the first EPG and stores the generated second EPG in an EPG providing server 220. The second EPG may further include a thumbnail image, a video image, a summary, cast, a genre, and the like, of a broadcasting program.

The second EPG stored in the EPG providing server 200 is stored in a second DB 164 of the data storage unit 160 of the TV 100. Although not shown, the TV may process the received second EPG to have a predetermined data structure and store the same. Namely, the TV 100 may separately store, manage, and use data based on the first EPG received through the broadcasting network and data of the second EPG-based received through the Internet.

Countries providing an EPG providing service through an EPG service provider include, Republic of Korea, the United States, the United Kingdom, France, Germany, Spain, and the like, and many other countries are expected to provide such a service in the future.

In response to the broadcast-related information request from the application, the controller 180 may selectively search the first DB 162 and the second DB 164 and obtain requested broadcast-related information based on the search result. For example, when a basic broadcast program schedule is requested, the controller 180 may search the first DB 162 based on the first EPG having higher reliability and obtain a basic broadcast program schedule. However, when a video related to a broadcast program having large data capacity is requested, the controller 180 may search the second DB 164 based on the second EPG including various types of information and obtain a video related to a broadcast program.

Namely, in the broadcast receiving device 100, at least one of the first DB 162 and the second DB 164 may be a subject to be searched relating to requested broadcast-related information according to types of broadcast-related information requested by the application 230 being executed.

Figure 5:
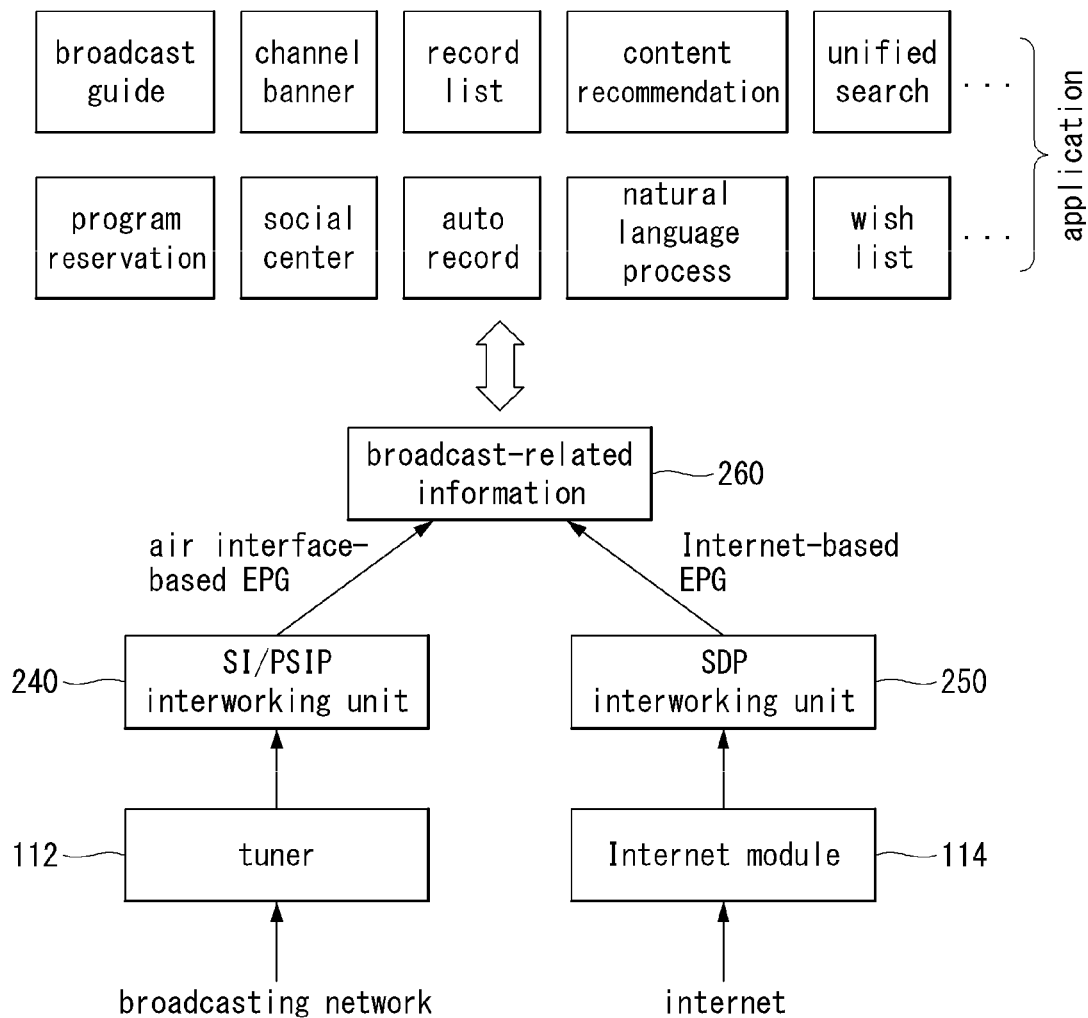
FIG. 5 is a view illustrating an example conceptually illustrating a process of providing broadcast-related information in the broadcast receiving device according to an embodiment of the present invention.

FIG. 5 is a view illustrating an example conceptually illustrating a process of providing broadcast-related information in the broadcast receiving device 100 according to an embodiment of the present invention.

A tuner 112 receives a broadcast signal including a service information (SI)/program & system information protocol (PSIP)-based broadcast information through a broadcasting network. The tuner 112 is part of a broadcast receiving module of the communication unit 110. The other components of the broadcast receiving module are omitted for the purposes of description. SI is a protocol for transmitting broadcast information aggregated through a predetermined classification, and PSIP is a protocol for transmitting information regarding a broadcast program based on an advanced television system committee (ATSC) standard.

An SI/PSIP interworking unit 240 extracts an EPG from a broadcast signal received through the tuner 112 and outputs the extracted EPG to a broadcast-related information providing unit 260. The EPG information extracted from the broadcast signal is referred to as an "air interface-based EPG" in FIG. 5. The SI/PSIP interworking unit 240 may also be part of the broadcast receiving module.

The Internet module 114 receives a signal including broadcast-related data from the Internet. In this case, the Internet module 114 serves as a service delivery platform and receives data. Here, the SDP interworking unit 250 extracts the EPG from the received signal and outputs the extracted EPG to the broadcast-related information providing unit 260. The extracted EPG information is referred to as an "Internet-based EPG" in FIG. 5. The SDP interworking unit 250 may form a part of an Internet module.

When the air interface-based EPG and the Internet-based EPG are received, the broadcast-related information providing unit 260 may process the received EPGs to generate broadcast-related information and make the broadcast-related information into DB and store the same, or may merge and analyze the two EPGs and make the same into a DB having a single data structure and store the same.

After the generated broadcast-related information is stored, when a broadcast-related information request is received from an application, the broadcast-related information providing unit 260 may search the DB to obtain the requested broadcast-related information. For reference, the broadcast-related information providing unit 260 may be a conceptual block comprehensively executing functions of the controller 180, the data storage unit 160, and the like, as described above.

The application that requests the broadcast-related information from the broadcast-related information providing unit 260 may include a broadcast guide, viewing reservation, a channel banner, a social center, and the like. The broadcast-related information requested by the application may be extracted from an air interface-based EPG or may be extracted from an Internet-based EPG.

Meanwhile, which of the air interface-based EPG and the Internet-based EPG has better quality may vary depending on countries. However, in general, air interface-based EPG has reliability higher than that of the Internet-based EPG. The reason for this is because the air interface-based EPG is directly provided by a reputable broadcasting station, while the Internet-based EPG is generated by an EPG service provider based on an air interface-based EPG.

However, in terms of quantity of provided information, the Internet-based EPG is superior to the air interface-based EPG in many cases. This is because capacity allocated to the Internet-based EPG is greater than that allocated to the air interface-based EPG. Thus, the Internet-based EPG may include larger data such as a program thumbnail image, a program-related video, and the like, not provided by the air interface-based EPG.

FIG. 6 is a view illustrating an example of information included in an air interface-based EPG and information include an Internet-based EPG according to each country.

The fact that the amount of information included the Internet-based EPG is greater than the amount of information included in the air interface-based EPG is common to every country. In a typical example, it can be seen that the Internet-based EPG of each country includes a thumbnail image with respect to a program having large data capacity. Also, it can be seen that the Internet-based EPG further includes various types of information such as an episode, an actor, a director, and the like, of a program not included in the air interface-based EPG. A salient point of the Internet-based EPG includes a program ID, unlike the air interface-based EPG. The program ID may be used for removing duplicated program information, collecting ratings, and the like. Also, it can be seen that the air interface-based EPG of the United States has very low coverage.

As discussed above with reference to FIG. 6, Information included in the air interface-based EPG and the Internet-based EPG may vary depending on countries. Thus, the broadcast receiving device 100 according to an embodiment of the present invention may determine whether to search a DB generated based on the air interface-based EPG, whether to search a DB generated based on the Internet-based EPG, or whether to search both in order to obtain a broadcast-related signal requested by an application. Namely, a search priority with respect to DBs for obtaining broadcast-related information requested by an application may vary depending on the country in which the broadcast receiving device 100 is driven.

Meanwhile, with respect to broadcast information which is included in broadcast-related information generated based on the Internet-based EPG but not included in broadcast-related information generated based on the air interface-based EPG, the broadcast receiving device 100 may provide a higher priority to broadcast-related information generated based on the Internet-based EPG regardless of a predetermined search priority.

For example, in a case in which a thumbnail image with respect to a particular program included only in the Internet-based EPG is requested by an application, the broadcast receiving device 100 may search for only broadcast-related information generated based on the Internet-based EPG and obtain the requested thumbnail image.

Figure 7:
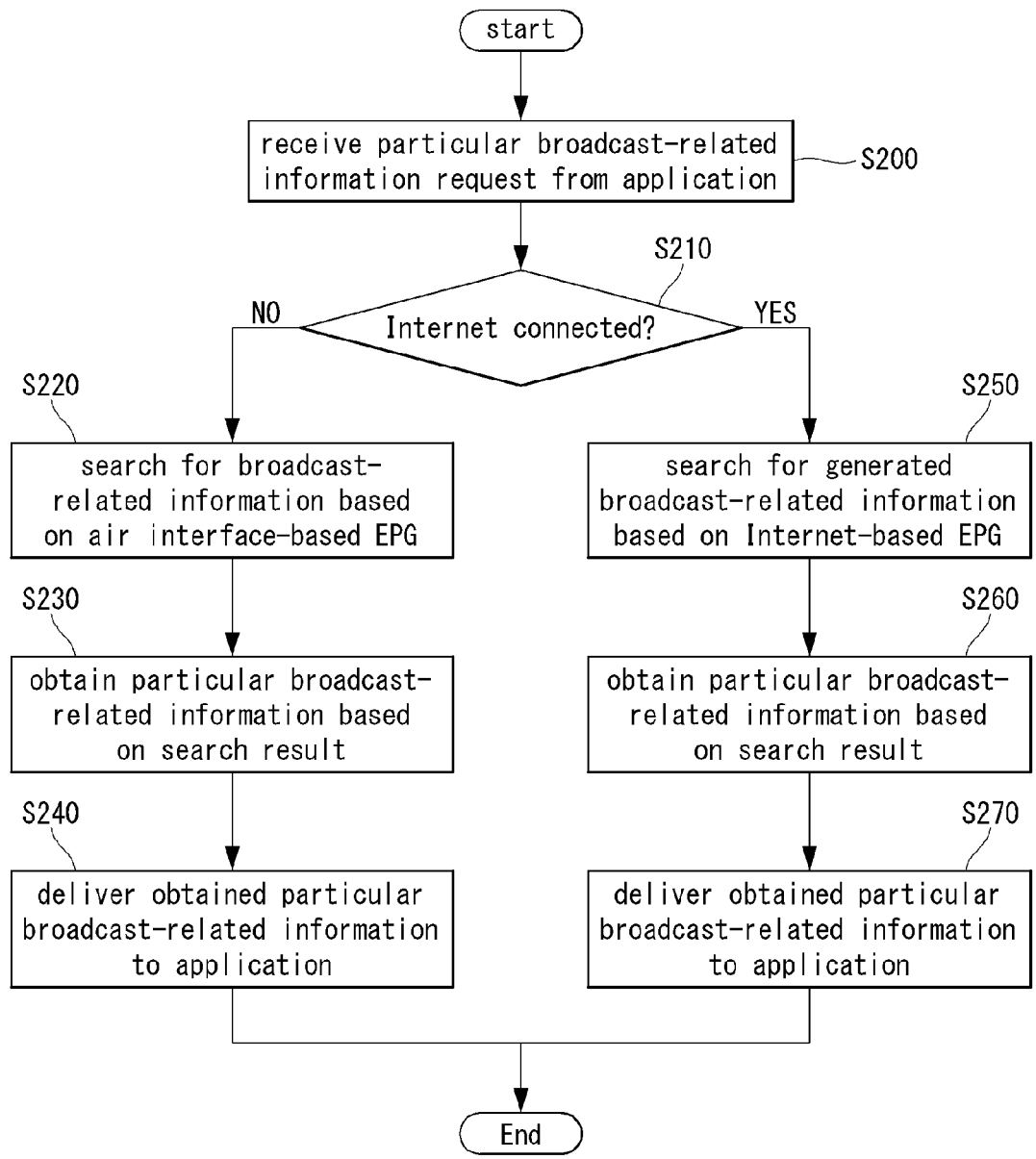
FIG. 7 is a flow chart illustrating another example of a method for driving a broadcast receiving device according to an embodiment of the present invention.

FIG. 7 is a flow chart illustrating another example of a method for driving a broadcast receiving device according to an embodiment of the present invention. Hereinafter, the method for driving a broadcast receiving device will be described with reference to the relevant drawings.

A particular broadcast-related information request is received from an application (S200). Then, the controller 180 of the broadcast receiving device 100 determines whether the broadcast receiving device 100 is connected to the Internet (S210).

When the broadcast receiving device 100 is not connected to the Internet, the controller 180 searches for broadcast-related information based on the air interface-based EPG (S220), obtains particular broadcast-related information based on the search result (S230), and delivers the obtained particular broadcast-related information to the application (S240).

However, when the broadcast receiving device 100 is connected to the Internet, the controller 180 searches for broadcast-related information generated based on the Internet-based EPG (S250), obtains particular broadcast-related information based on the search result (S260), and delivers the obtained particular broadcast-related information to the application (S270).

Namely, the broadcast receiving device according to an embodiment of the present invention may vary a search range for obtaining broadcast-related information based on a connection state of the Internet.

Figure 8:
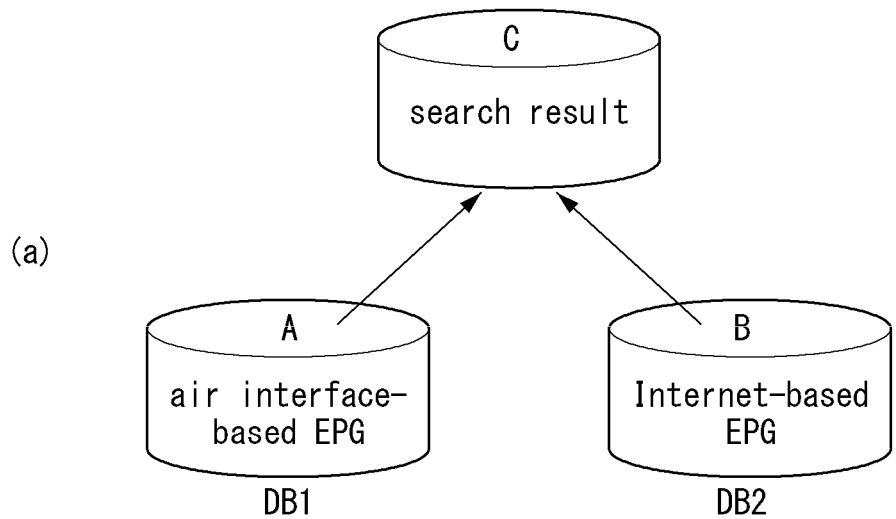
FIG. 8 is a view conceptually illustrating the exemplary method for driving the broadcast receiving device of FIG. 7.

FIG. 8 is a view conceptually illustrating the exemplary method for driving the broadcast receiving device of FIG. 7.

In FIG. 8, based on a particular broadcast-related information request from an application, a search result obtained from an air interface-based EPG DB (DB1) is designated as A, a search result obtained from the Internet-based EPG DB (DB2) is designated as B, and a search result finally obtained by the controller 180 is C.

Referring to (b) of FIG. 8, in the Republic of Korean, it can be seen that, when the Internet is not connected, a final search result by the controller 180 may be a search result from the air interface-based EPG DB, while when the Internet is connected, a final search result by the controller 180 is a search result from the Internet-based EPG DB.

Meanwhile, in Europe, it can be seen that when the when the Internet is not connected, a final search result by the controller 180 may be a search result from the air interface-based EPG DB, while when the Internet is connected, a final search result by the controller 180 is a combination of a search result from the air interface-based EPG DB and a search result from the Internet-based EPG DB.

When the search results from the two DBs are not identical, the controller 180 may select one among the search result from the air interface-based EPG DB and the search result from the Internet-based EPG DB based on a reliability priority previously determined for the particular broadcast-related information. The predetermined reliability priority may differ depending on the particular broadcast-related information or may differ depending on a country in which the broadcast receiving device 100 is driven.

Namely, the broadcast receiving device 100 according to an embodiment of the present invention may obtain the particular broadcast-related information requested by the application by merging and analyzing the search result from the air interface-based EPG DB and the search result from the Internet-based EPG DB.

Figure 9:
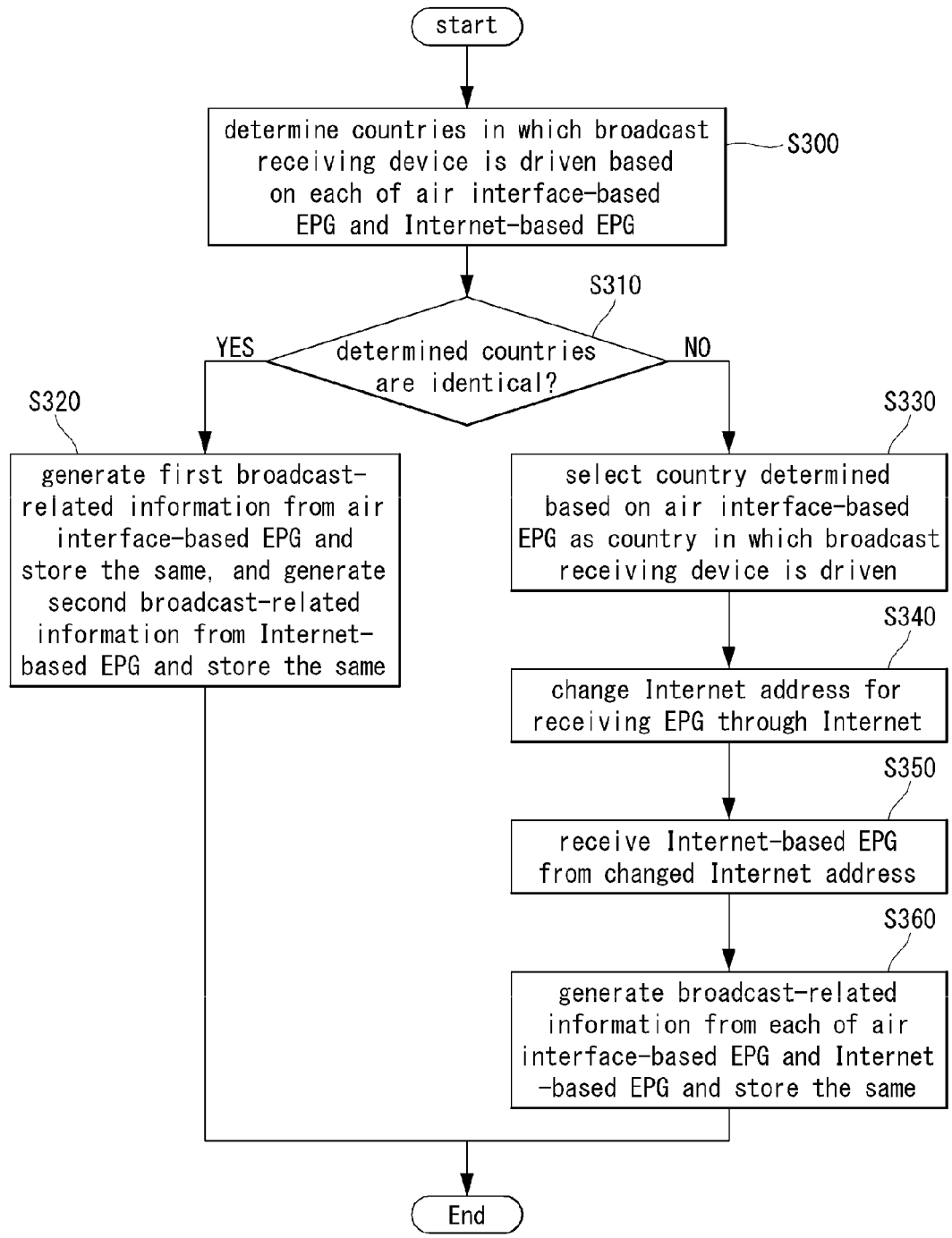
FIG. 9 is a flow chart illustrating another example of a method for driving a broadcast receiving device according to an embodiment of the present invention.

FIG. 9 is a flow chart illustrating another example of a method for driving a broadcast receiving device according to an embodiment of the present invention. Hereinafter, the method for driving a broadcast receiving device will be described with reference to the relevant drawings.

When an air interface-based EPG and an Internet-based EPG are received through the communication unit 110, the controller 180 determines countries in which the broadcast receiving device 100 is driven, based on each of the received EPGs (S300). Thereafter, the controller 180 determines whether the countries determined based on the two EPGs are identical (S310).

When the two countries determined in step S310 are identical, the controller 180 generates broadcast-related information from the air interface-based EPG and stores the same, and generates broadcast-related information from the Internet-based EPG and stores the same (S320). The broadcast-related information generated from the two EPGs may be made into DBs having different data structures and stored or may be merged to form a DB having a single data structure and stored.

However, when the two countries determined in step S310 are different, the controller 180 selects the country determined based on the air interface-based EPG, as a country in which the broadcast receiving device 100 is driven (S330). The reason is because the country determined based on information included in a received broadcast signal has a higher probability of being a country in which the broadcast receiving device 100 is driven in actuality.

Thereafter, the controller 180 changes an Internet address for receiving the EPG through the Internet into predetermined other network address corresponding to the country determined based on the air interface-based EPG (S340). The controller 180 receives a new Internet-based EPG from the changed Internet address (S350).

Thereafter, the controller 180 generates broadcast-related information from the air interface-based EPG and stores the same, and generates broadcast-related information from the Internet-based EPG received from the changed Internet address and stores the same (S360).

As discussed above, the broadcast receiving device 100 according to an embodiment of the present invention may automatically determine a country in which the broadcast receiving device 100 is actually driven or perform a correction function, and may receive an Internet-based EPG or receive a new Internet-based EPG.

Figure 10:
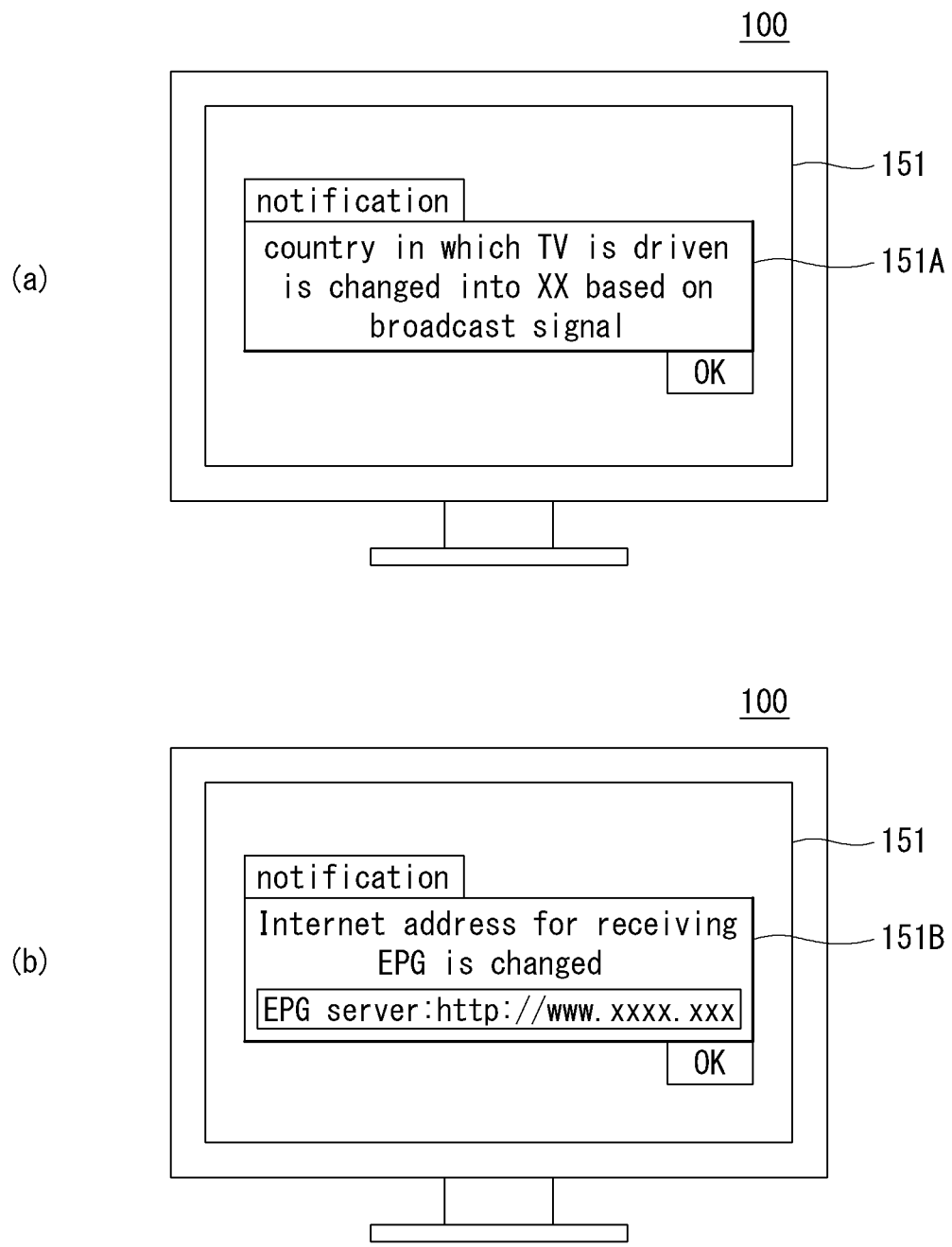
FIG. 10 is a view illustrating various examples of a graphic user interface provided by the broadcast receiving device according to an embodiment of the present invention according to the method for driving a broadcast receiving device illustrated in FIG. 9.

FIG. 10 is a view illustrating various examples of a graphic user interface provided by the broadcast receiving device according to an embodiment of the present invention according to the method for driving a broadcast receiving device illustrated in FIG. 9.

Referring to (a) of FIG. 10, it can be seen that, when a country in which the broadcast receiving device 100 is driven is changed based on the air interface-based EPG, the broadcast receiving device 100 displays a corresponding graphic user interface (GUI) 151A. Although not shown, the broadcast receiving device 100 may provide a GUI for selecting a country in which the broadcast receiving device 100 to be driven.

Referring to (b) of FIG. 10, it can be seen that, when a country in which the broadcast receiving device 100 is driven is changed based on the air interface-based EPG, the broadcast receiving device 100 may set a new Internet address for receiving the Internet-based EPG and displays a corresponding GUI 151B on the display unit 151. Meanwhile, although not shown, the broadcast receiving device 100 may provide a GUI for inputting a new Internet address for receiving the Internet-based EPG or a GUI for selecting a new Internet address.

Figure 11:
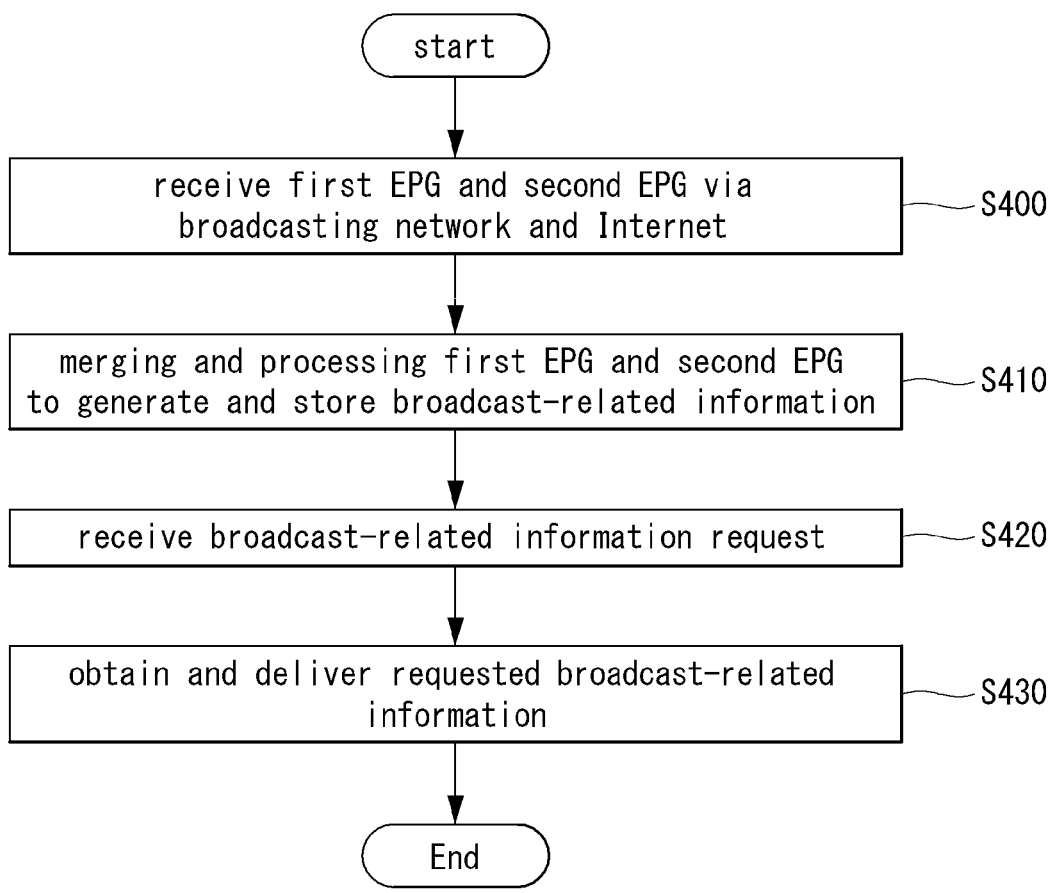
FIG. 11 is a flow chart illustrating another example of a method for driving a broadcast receiving device according to an embodiment of the present invention.

FIG. 11 is a flow chart illustrating another example of a method for driving a broadcast receiving device according to an embodiment of the present invention. Hereinafter, the method for driving a broadcast receiving device will be described with reference to the relevant drawings.

A first EPG is received through a broadcasting network and a second EPG is received through the Internet (S400). Then, the controller 180 merges and processes the first and second EPGs to generate broadcast-related information and stores the same in the data storage unit 160 (S410).

Here, the controller 180 may determine a predetermined priority for each of the first and second EPGs. For example, in case of particular data which is not included in any one of the first and second EPGs but included in the other remaining one, the controller 180 may store the particular data as the broadcast-related information regardless of the predetermined priority. In a specific example, in case of a thumbnail image with respect to a program generally not included in the first EPG, the controller 180 may store the thumbnail image included in the second EPG as broadcast-related information regardless of the predetermined priority.

In another example, in a case in which data included in the first EPG and data included in the second EPG collide, the controller 180 may generate broadcast-related information based on the data included in an EPG selected from among the first and second EPGs according to the given priority. In a specific example, with respect to a broadcast schedule for each channel, the controller 180 may give a higher priority to the data included in the first EPG. The reason for this is because, in general, reliability of the first EPG is higher than that of the second EPG.

Figure 12:
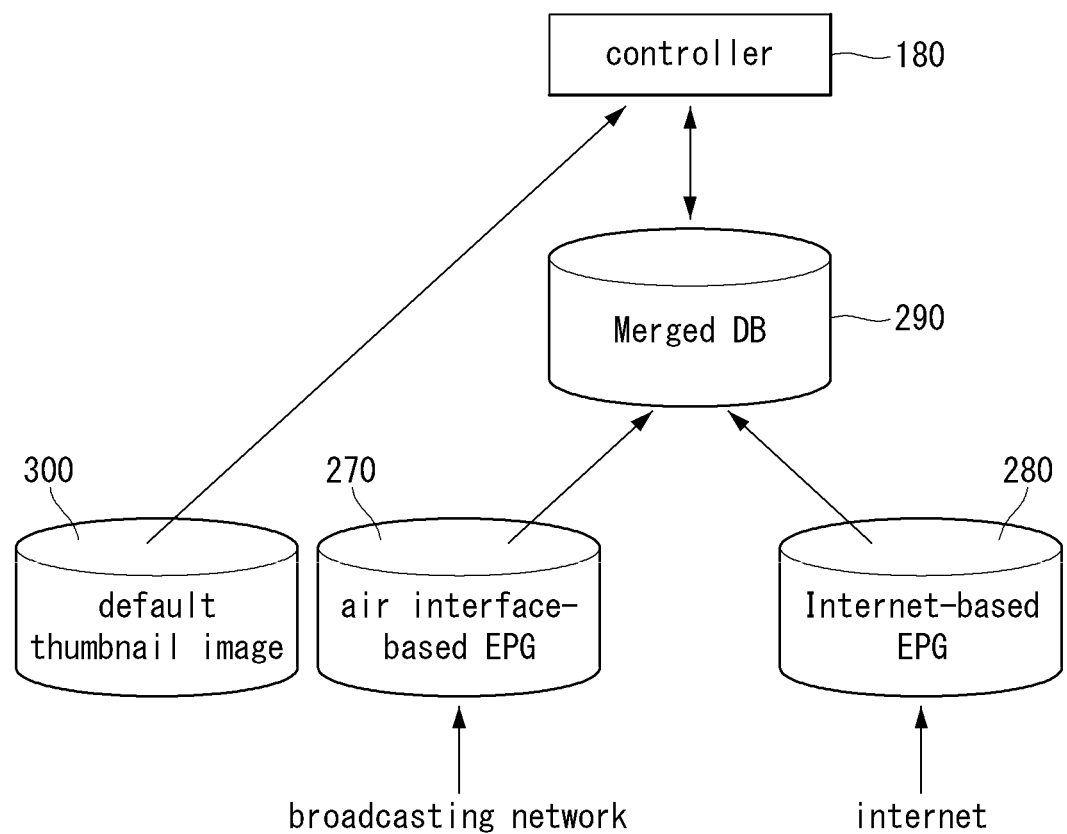
FIG. 12 is a view conceptually illustrating an example of a requested broadcast-related information according to the method for driving a broadcast receiving device illustrated in FIG. 11.

FIG. 12 is a view conceptually illustrating an example of a requested broadcast-related information according to the method for driving a broadcast receiving device illustrated in FIG. 11.

Referring to FIG. 12, it can be seen that the controller 180 merges and analyzes the air interface-based EPG 270 and the Internet-based EPG 280 to construct a merged DB 290. A reference for merging and analyzing the air interface-based EPG 270 and the Internet-based EPG 280 has been described above with reference to FIG. 11, so an example of establishing a schedule list for each channel will be described as a specific example thereof.

The controller 180 generates a channel list based on the air interface-based EPG. This is because reliability of the air interface-based EPG is higher than the Internet-based EPG and a possibility of omitting a channel list in the air interface-based EPG is extremely low. The controller 180 may also generate a schedule list of each channel based on the air interface-based EPG. However, in case of a schedule list which is absent in the air interface-based EPG but present in the Internet-based EPG, the Internet-based EPG may be used. The controller 180 may basically use the air interface-based EPG to generate program information included in a schedule of each channel, and may add information present only in the Internet-based EPG.

In FIG. 12, it can be seen that a default thumbnail image 300 may be used by the controller 180, apart from the air interface-based EPG and the Internet-based EPG. The default thumbnail image 300 may be a thumbnail image related to each program genre not included in the first EPG. In a case in which the Internet is not connected, the controller 180 may associate the thumbnail image of each of the previously stored program genres with broadcast-related information generated based on the first EPG and provide the same.

In FIG. 12, a thumbnail image of each genre is taken as an example of information for complementing the broadcast-related information based on the first EPG, but the present invention is not limited thereto. Namely, the broadcast receiving device 100 according to an embodiment of the present invention may be used to complement the broadcast-related information based on the first EPG, while separately managing information of a particular category not included in the first EPG.

FIG. 13 is a view illustrating an example of broadcast-related information according to the related art EPG, namely, the related art analog broadcast receiving device 100 or the general distribution broadcast receiving device 100 directly receives an EPG from a broadcasting station. The receiving device may be able to receive an EPG through the Internet, as well as directly receiving an EPG through a ground wave. In the description regarding the drawing, various aspects of receiving an EPG through a ground wave and receiving an EPG through the Internet will be described.

FIG. 13(*a*) is a view illustrating the displaying of first broadcast-related information included in a first EPG. In this case, the first EPG may be an EPG directly provided from a broadcasting station.

Since the first EPG is directly provided from a broadcasting station in real time and updated in the broadcasting station in real time, information included in the first EPG is accurate. Namely, the first broadcast-related information generated from the first EPG includes accurate information regarding a broadcast program. In detail, as illustrated in FIG. 13(*a*), information such as a title, a broadcast time, and the like, of a broadcast program are accurate.

However, as illustrated in FIG. 13(*a*), contents region 155 may be empty or a description regarding a broadcast program may be poor. Namely, information such as contents, a detailed description, or the like, of a broadcast program is poor or is not included in the broadcast-related information. Also, as illustrated in FIG. 13(*a*), a portion or the entirety of the broadcast program schedule region 156 may be empty. Namely, the user cannot check broadcast program schedule information regarding channels other than the broadcast program currently output through a TV. Thus, in order to check broadcast program schedule information regarding other broadcast channels, the user should select other broadcast channel desired to be checked, at least one time. In addition, since the first EPG does not include program information regarding cable broadcasting, only information regarding a terrestrial broadcast program is provided to the user.

FIG. 13(*b*) is a view illustrating an example of displaying second broadcast-related information included in a second EPG. In this case, the second EPG may be an EPG processed based on an EPG provided from a broadcasting station. In particular, the second EPG may be an EPG provided from an external Internet server based on the Internet.

Thus, since the second EPG is provided through an Internet server, the second EPG may include rich information, compared with the first EPG. Namely, the second broadcast-related information generated from the second EPG includes detailed information regarding a broadcast program. In detail, as in the contents region 155 illustrated in FIG. 13(*b*), a detailed description of the contents of the broadcast program is provided, and in addition, a link may be formed through the Internet by including a URL. Also, a thumbnail image regarding a broadcast program where a cursor is positioned may be displayed in a thumbnail region 157. Also, as in the broadcast program schedule region 156 illustrated in FIG. 13(*b*), broadcast program schedule information regarding terrestrial broadcast channels other than a terrestrial broadcast program currently output through the TV may be displayed. In addition, all of information regarding terrestrial broadcast programs and cable broadcast programs may be displayed.

However, since the second EPG is provided through an Internet server from a broadcasting station, an update speed thereof may be slow, relative to the first EPG. Also, the second broadcast-related information included in the second EPG has no choice but to be inaccurate, relative to the first broadcast-related information included in the first EPG updated in real time. In detail, information in a title region 153, a time region 154, and the like, illustrated in FIG. 13(*b*) may be non-updated information. Thus, inaccurate broadcast-related information is provided.

Thus, when advantages of the EPG directly provided from a broadcasting station and advantages of the EPG provided from the external Internet server, or the like, are combined, accurate and detailed broadcast-related information may be obtained. Hereinafter, a means for receiving accurate, rich broadcast-related information will be described in detail.

Figure 14:
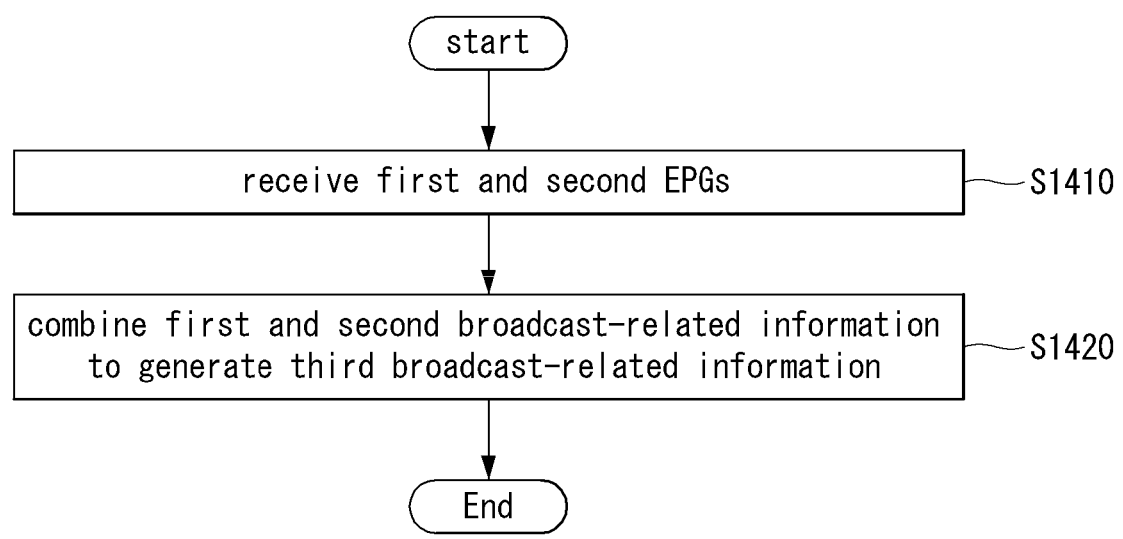
FIG. 14 is a flow chart illustrating an example of a method for controlling a broadcast receiving device according to another embodiment of the present invention.

FIG. 14 is a flow chart illustrating an example of a method for controlling a broadcast receiving device 100 according to another embodiment of the present invention.

Referring to FIG. 14, the broadcast receiving device 100 receives a first EPG and a second EPG through the broadcasting network and the Internet, respectively (S1410).

Here, the EPG may include broadcast-related information. In detail, the broadcast-related information of the EPG may refer to information regarding a title, a subtitle, a start time, an end time, a broadcast time, contents, a channel name, a genre, a genre image, a rating, a thumbnail, and the like, of a broadcast program.

Meanwhile, the communication unit may simultaneously receive the first EPG and the second EPG. In detail, the communication unit may receive the first EPG through the broadcasting network and the second EPG through the Internet. In this case, the storage unit 160 may store first broadcast-related information included in the first EPG and second broadcast-related information included in the second EPG.

Meanwhile, the first EPG may be an EPG directly provided from a broadcasting station. The second EPG may be an EPG processed based on an EPG provided from a broadcasting station, and provided from an external server based on the Internet.

Thereafter, the broadcast receiving device 100 combines the first broadcast-related information broadcast-related information generated from the first EPG and the second broadcast-related information generated from the second EPG to generate third broadcast-related information (S1420).

In detail, the controller 180 may obtain first broadcast-related information and second broadcast-related information stored in the storage unit 160. The controller 180 may determine whether a first title of a broadcast program included in the obtained first broadcast-related information and a second title of a broadcast program included in the second broadcast-related information are identical. A specific method for determining whether the first title included in the first broadcast-related information and the second title included in the second broadcast-related information are identical will be described in detail with reference to FIGS. 15 through 18.

Meanwhile, when it is determined that the first title included in the first broadcast-related information and the second title included in the second broadcast-related information are identical, the controller 180 may combine the first broadcast-related information and the second broadcast-related information to generate third broadcast-related information.

Hereinafter, the specific method for determining whether the first title included in the first broadcast-related information and the second title included in the second broadcast-related information are identical will be described.

Figure 15:
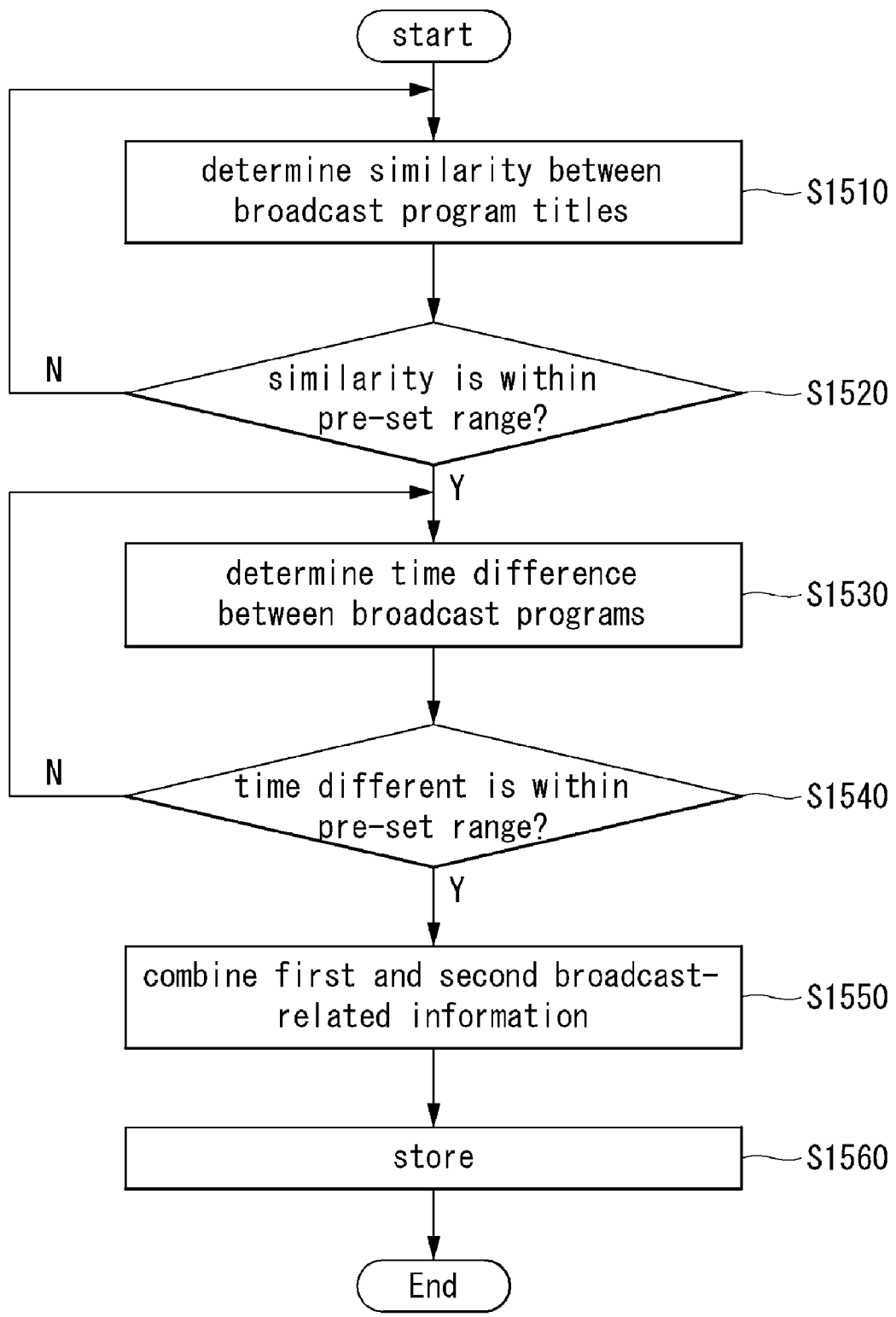
FIG. 15 is a flow chart illustrating another example of a method for controlling a broadcast receiving device according to another embodiment of the present invention.

FIG. 15 is a flow chart illustrating another example of a method for controlling a broadcast receiving device 100 according to another embodiment of the present invention.

Referring to FIG. 15, the broadcast receiving device 100 determines similarity between the first title included in the first broadcast-related information and the second title included in the second broadcast-related information (S1510). Here, the similarity may refer to a possibility that the first title and the second title are similar so a broadcast program corresponding to the first title and a broadcast program corresponding to the second title are considered to be the same broadcast program. A specific method for determining a similarity between the first title and the second title will be described in detail with reference to FIG. 16.

Thereafter, the broadcast receiving device 100 determines whether the similarity is within a pre-set range (S1520). Namely, when the similarity between the first title and the second title is within a pre-set range (S1520_Y), the controller 180 may determine that a time difference between the broadcast program corresponding to the first title and the broadcast program corresponding to the second title (S1530).

However, unlike the case illustrated in FIG. 15, whether broadcast programs are identical may also be determined by determining only similarity. Namely, when the similarity between the first tile and the second title is within the pre-set range (S1520_Y), the controller 180 may determine that the broadcast program corresponding to the first title and the broadcast program corresponding to the second title are identical, without determining a time difference between the broadcast program corresponding to the first title and the broadcast program corresponding to the second title. Thus, the controller 180 may combine the first broadcast-related information and the second broadcast-related information to generate third broadcast-related information (S1550). Conversely, when the similarity between the first tile and the second title is outside the pre-set range (S1520_N), the controller 180 may perform step S1530 of determining a time difference between the broadcast programs described hereinafter.

Meanwhile, the broadcast receiving device 100 may determine a time difference between the broadcast program corresponding to the first title and the broadcast program corresponding to the second title (S1530). Here, the broadcast-related information may include a start time and an end time of each of the broadcast programs. Thus, in broadcast programs whose first title and second title are determined to be identical, a start time included in the first broadcast-related information may be different from a start time included in the second broadcast-related information may differ. Similarly, in broadcast programs determined whose first title and second title are determined to be identical, an end time included in the first broadcast-related information may be different from an end time included in the second broadcast-related information. Thus, the controller 180 determines the time difference. The determining of a time difference, in addition to determining a similarity between titles, is to more accurately match broadcast programs. A specific method for determining a time difference will be described in detail with reference to FIG. 17.

Thereafter, the broadcast receiving device 100 determines whether the time difference is within the pre-set range (S1540). Namely, with respect to the broadcast programs in which a similarity between the first title and the second title is within a pre-set range, when a time difference between a start time included in the first broadcast-related information and a start time included in the second broadcast-related information or a time difference between an end time included in the first broadcast-related information and an end time included in the second broadcast-related information is within a pre-set range (S1540_Y), the controller 180 may determine that the broadcast program corresponding to the first title and the broadcast program corresponding to the second title are identical.

Thereafter, the broadcast receiving device 100 combines the first broadcast-related information and the second broadcast-related information (S1550). The controller 180 may generate third broadcast-related information by combining the first broadcast-related information and the second broadcast-related information. In this case, the third broadcast-related information may be generated by selectively extracting a portion of the first broadcast-related information accurate relative to the second broadcast-related information and a portion of the second broadcast-related information rich relative to the first broadcast-related information and combining the same by the controller 180. This will be described in detail with reference to FIG. 19.

Meanwhile, the broadcast receiving device 100 may store the generated third broadcast-related information in the storage unit 160 (S1560). In detail, the controller 180 may make the third broadcast-related information obtained by combining the first and second broadcast-related information into a database and store the same in the storage unit 160. In this case, since the third broadcast-related information as a combination of the first and second broadcast-related information broadcast-related information is stored in the storage unit 160 in advance, a time required for displaying the third broadcast-related information may be saved.

In addition, the controller 180 may make the first and second broadcast-related information into databases having different data structures and store the same in the storage unit 160. In detail, the controller 180 may make the first and second broadcast-related information into databases, respectively, and when an output request for the broadcast-related information is received, the controller 180 may combine the first and second broadcast-related information respectively stored as databases, and output the same.

FIG. 16 is a view conceptually illustrating an example of matching of broadcast-related information according to titles of broadcast programs by a broadcast receiving device 100 according to another embodiment of the present invention. A specific method for determining a similarity between a first title and a second title will be described with reference to FIG. 16.

In the broadcast receiving device 100 according to an embodiment of the present invention, the controller 180 may compare a character string of the first title included in the first broadcast-related information and a character string of the second title included in the second broadcast-related information in units of pre-set bytes to determine second broadcast-related information combined with the first broadcast-related information. In this case, the controller 180 determines the second broadcast-related information combined with the first broadcast-related information depending on a similarity between the first title and the second title, and the similarity may be determined by Equation 1 shown below.

$$\text{Similarity} = \frac{(\text{Number of bytes of same character string}) \times 2}{(\text{length of first character string}) + (\text{length of second character string})} \quad \text{[Equation 1]}$$

However, the similarity is not limited to Equation 1 and may also be determined by various algorithms regarding similar text detection, different from Equation 1.

In this case, when the similarity is equal to or greater than a pre-set value, the controller 180 may determine the second broadcast-related information combined with the first broadcast-related information. Also, when the similarity is equal to or greater than a particular optimal threshold value, the controller 180 may determine second broadcast-related information combined with the first broadcast-related information. For example, the particular optimal threshold value may be 0.4, and hereinafter, the case in which the particular threshold value is set to 0.4 will be described.

It is assumed that the first title included in the first broadcast-related information is "COSMOS" as illustrated in FIG. 16(*a*) and the second title included in the second broadcast-related information is "[HD]COSMOS" as illustrated in FIG. 16(*b*). In this case, both the first title and the second title are composed of alphabets, and one alphabet corresponds to 1 byte.

Referring to FIG. 16(*a*), a length of the character string corresponding to the first title is 6 bytes, and referring to FIG. 16(*b*), a length of the character corresponding to the second title is 10 bytes. Also, the character string identical in the first title and the second title is 6 bytes corresponding to "COSMOS". As a result, according to Equation 1, the similarity is 0.75, which is greater than 0.4, a pre-set reference, and thus, it may be determined that the first title and the second title are identical. Thus, the controller 180 may determine a target to be combined with the first broadcast-related information including the first title, as the second broadcast-related information including the second title. Namely, the third broadcast-related information may be a combination of the first broadcast-related information corresponding to "COSMOS" and the second broadcast-related information corresponding to "[HD]COSMOS".

In another example, FIGS. 16(*b*) and 16(*c*) are compared. In this case, "[HD]COSMOS" illustrated in FIG. 16(*b*) may be a first title and "COSMOS[LIVE]" illustrated in FIG. 16(*c*) may be a second title. A length of a character corresponding to the first title is 10 bytes, a length of a character string corresponding to the second title is 12 bytes, and a character string identical in the first title and the second title is 6 bytes corresponding to "COSMOS". As a result, according to Equation 1, a similarity is about 0.55, and since the similarity is greater than 0.5, a pre-set reference, it may be determined that the first title and the second title are identical. Thus, the third broadcast-related information may be a combination of the first broadcast-related information corresponding to "[HD]COSMOS" and the second broadcast-related information corresponding to "COSMOS[LIVE]".

Meanwhile, the controller 180 may determine the second broadcast-related information combined with the first broadcast-related information starting from a point in time at which the character string of the first title and the character string of the second title are first identical.

In the foregoing example, referring to FIG. 16(*a*), the length of the character string corresponding to the first title is 6 bytes. Here, the controller 180 may determine the character of the second title first identical to the character of the first title. Thus, referring to FIG. 16(*b*), since the character of the second title first identical to "C", the character of the first title, is "C", a length of the character string of the second title calculated from "C" excluding "[HD]" included in the second title is 6 bytes. AS a result, a similarity according to Equation 1 is 1. The similarity 1 may refer to that the first title and the second title are completely identical. Thus, the controller 180 may determine a target combined with the first broadcast-related information, as the second broadcast-related information including the second title. Namely, the third broadcast-related information may be a combination of the first broadcast-related information corresponding to "COSMOS" and the second broadcast-related information corresponding to "[HD]COSMOS".

Similarly, FIGS. 16(*b*) and 16(*c*) will be compared. In this case, "[HD]COSMOS" illustrated in FIG. 16(*b*) may be a first title and "COSMOS[LIVE]" illustrated in FIG. 16(*c*) may be a second title. A length of the character string of the second title is 12 bytes. The controller 180 may determine a character of the first title first identical to the character of the second title, and since the character of the first title first identical to the character "C" of the second title is "C", a length of the character string of the first title calculated starting from "C", excluding "[HD]" included in the first title is 6 bytes. As a result, a similarity according to Equation 1 is about 0.67, greater than 0.4 as the pre-set reference. Thus, the third broadcast-related information may be a combination of the first broadcast-related information corresponding to "COSMOS" and the second broadcast-related information corresponding to "[HD]COSMOS".

FIG. 17 is a view conceptually illustrating an example of matching of broadcast-related information according to a time difference between broadcast programs by a broadcast receiving device 100 according to another embodiment of the present invention. Hereinafter, a specific method for determining a time difference between a broadcast program corresponding to a first title and a broadcast program corresponding to a second title will be described.

In the broadcast receiving device 100 according to an embodiment of the present invention, the controller 180 may determine second broadcast-related information combined with the first broadcast-related information according to a time difference between a start time and an end time of the broadcast program included in the first broadcast-related information and a time difference between a start time and an end time of a broadcast program included in the second broadcast-related information, and the time difference may be determined by Equation 2 shown below.

Time difference=|(first start time)−(second start time) +|(first end time)−(second end time)| [Equation 2]

However, the time difference is not limited to that of Equation 2, and may be determined various algorithms regarding a time difference detection, other than Equation 2.

In this case, the controller may determine such that the second broadcast-related information including a start time and an end time of a broadcast program having a minimum time difference with respect to a start time and an end time of the broadcast program included in the first broadcast-related information is included in the third broadcast-related information. Also, when the time difference calculated by Equation 2 is equal to or smaller than the particular optimized threshold value, the controller may determine the second broadcast-related information combined with the first broadcast-related information.

For example, as illustrated in FIG. 17, it is assumed that a first title included in the first broadcast-related information is "ABC NEWS" and a second title included in the second broadcast-related information is "ABC NEWS SPECIAL" and "XYZ NEWS". In this case, a start time and an end time of each of the broadcast programs corresponding to the first title and the second title are as shown in FIG. 17, and the controller 180 may calculate a time difference between broadcast programs by using the start time and the end time of each of the broadcast programs.

Referring to FIG. 17, in "ABC NEWS" and "ABC NEWS SPECIAL", a time difference between the start times is 10 minutes and a time difference between end times is 10 minutes. As a result, according to Equation 2, a total time difference between the two broadcast programs is 20 minutes. Also, in "ABC NEWS" and "XYZ NEWS", a time difference between start times is 0 and a time difference between end times is 30 minutes. As a result, according to Equation 2, a total time difference between the two broadcast programs is 30 minutes.

Since the total time difference between "ABC NEWS" and "ABC NEWS SPECIAL" is 20 minutes and the total time difference between "ABC NEWS" and "XYZ NEWS" is 30 minutes, the controller 180 may determine that "ABC NEWS" and "ABC NEWS SPECIAL" whose total time difference is minimum, as the same broadcast program. Thus, the controller 180 may determine the target to be combined with the first broadcast-related information including the first title "ABC NEWS", as the second broadcast-related information including "ABC NEWS SPECIAL", the second title. Namely, the third broadcast-related information may be a combination of the first broadcast-related information corresponding to "ABC NEWS" and the second broadcast-related information corresponding to "ABC NEWS SPECIAL".

Meanwhile, although the third broadcast-related information is generated according to a time difference, broadcast programs may need to be matched more accurately. Hereinafter, a method for matching broadcast-related information by synthesizing titles of broadcast programs and a time difference between broadcast programs will be described.

Figures 18, 19:
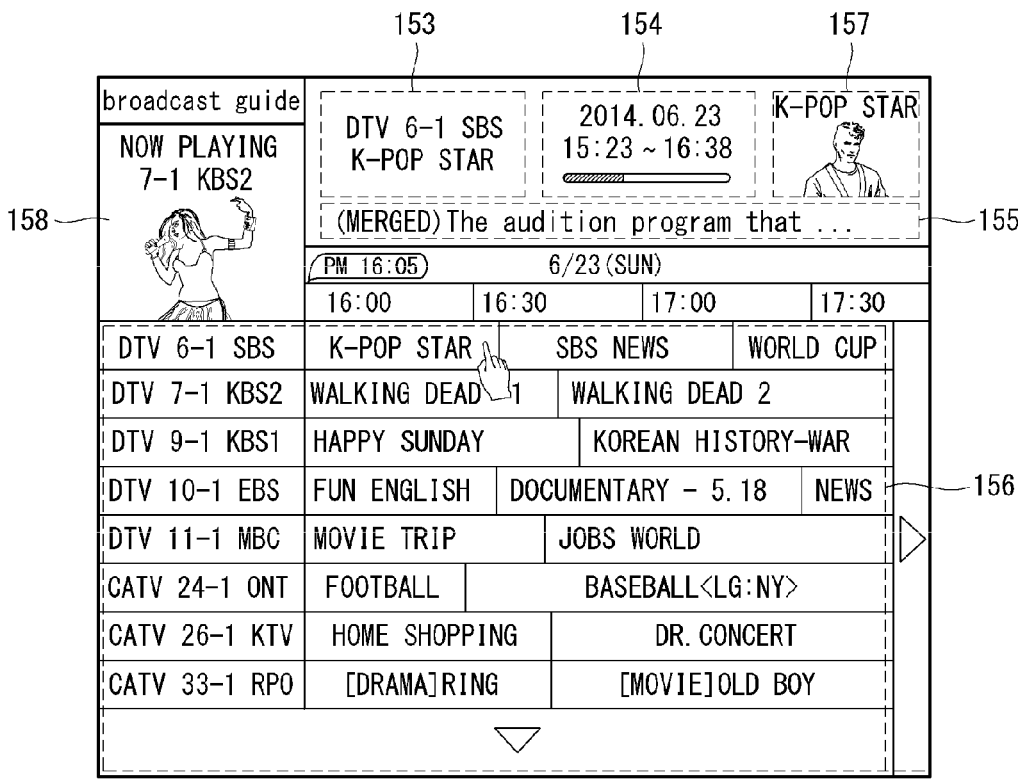
FIG. 18 is a view illustrating an example conceptually illustrating matching of broadcast-related information by synthesizing titles and time differences of broadcast programs by a broadcast receiving device according to another embodiment of the present invention.
FIG. 19 is a view illustrating an example of results obtained by combining air interface-based broadcast-related information and Internet-based broadcast-related information by a broadcast receiving device according to another embodiment of the present invention.

FIG. 18 is a view illustrating an example conceptually illustrating matching of broadcast-related information by synthesizing titles and time differences of broadcast programs by a broadcast receiving device 100 according to another embodiment of the present invention.

In the broadcast receiving device 100 according to an embodiment of the present invention, the controller 180 may preferentially determine a similarity and determine a time difference to determine second broadcast-related information to be combined with first broadcast-related information.

For example, as illustrated in FIG. 18, it is assumed that the first title included in the first broadcast-related information is "COSMOS" and the second title included in the second broadcast-related information is "ABC NEWS" and "[HD]COSMOS".

In this case, as illustrated in FIG. 16, a similarity between the first title "COSMOS" and "[HD]COSMOS" may be calculated as 0.75 or 1 by Equation 1. Also, a similarity between the first title "COSMOS" and "ABC NEWS" may be calculated as a value smaller than 0.4 by Equation 1.

Meanwhile, as illustrated in FIG. 17, a time difference between the broadcast program corresponding to the first title "COSMOS" and the broadcast program corresponding to "[HD]COSMOS" may be calculated as 20 minutes by Equation 2. Also, a time difference between the broadcast program corresponding to the first title "COSMOS" and the broadcast program corresponding to "ABC NEWS" may be calculated as 10 minutes.

In this case, with respect to the broadcast program corresponding to the first title "COSMOS", the broadcast program corresponding to "ABC NEWS" has a total time difference smaller than that of the broadcast program corresponding to "[HD]COSMOS". However, with respect to the first title "COSMOS", "[HD]COSMOS" has a similarity greater than "ABC NEWS". Thus, the controller 180 may preferentially determine the similarity and combine the first broadcast-related information corresponding to the first title "COSMOS" and the second broadcast-related information corresponding to the second title "[HD]COSMOS" to generate third broadcast-related information.

In this manner, when the similarity between the first title included in the first broadcast-related information and the second title included in the second broadcast-related information is equal to or smaller than 0.4 and a time difference between the two broadcast programs is minimum, the broadcast programs corresponding to both broadcast-related information are different broadcast programs and only the start time and the end time thereof are considered to be similar.

Thus, according to the broadcast receiving device 100 according to an embodiment of the present invention, the second broadcast-related information combined with the first broadcast-related information can be accurately determined.

FIG. 19 is a view illustrating an example of results obtained by combining air interface-based broadcast-related information and Internet-based broadcast-related information by a broadcast receiving device 100 according to another embodiment of the present invention.

In the broadcast receiving device 100 according to an embodiment of the present invention, the controller 180 may combine first broadcast-related information and the second broadcast-related information to generate third broadcast-related information, and the third broadcast-related information may be formed by combining the first broadcast-related information and the second broadcast-related information for supplementing the first broadcast-related information.

FIG. 19 illustrates an example of displaying third broadcast-related information generated by combining first broadcast-related information and second broadcast-related information. However, the displayed third broadcast-related information is not limited to that illustrated in FIG. 19 and may be variously modified and added. Hereinafter, a case in which a cursor is positioned in one of various broadcast programs displayed in the displayed broadcast program schedule region 156 will be assumed and described.

Referring to FIG. 19, a broadcast program selected by the controller 180 according to a user selection is displayed in a play region 158. In this case, the broadcast program with respect to a selected broadcast channel may be displayed in the play region 158 regardless of a position of the cursor, and a channel name or a channel number may be displayed on one side of the play region 158.

As described above with reference to FIG. 13, the first broadcast-related information may include accurate information in a title, a broadcast time, and the like, of a broadcast program. Thus, the information displayed in a title region 153 and a time region 154 in the generated third broadcast-related information may have been extracted from the first broadcast-related information. In detail, the third broadcast-related information may include at least one of a start time, an end time, a broadcast time, a title, a subtitle, and a channel name of the broadcast program included in the first broadcast-related information.

Here, at least one of the start time, the end time, and the broadcast time of the broadcast program where the cursor is positioned may be displayed in the time region 154. Referring to FIG. 19, the controller 180 may display a start time and an end time of a broadcast program where the cursor is positioned together with the current date in the time region 154. In addition, when the broadcast program where the cursor is positioned has been already broadcast, the controller 180 may display a progressive bar indicating a degree to which the broadcast has progressed. As discussed above, the information displayed in the time region 154 may have been extracted from the first broadcast-related information.

Meanwhile, at least one of a title and a subtitle of the broadcast program where the cursor is positioned may be displayed in a title region 153. In this case, a channel name or a channel number of the broadcast program where the cursor is positioned may be displayed on one side of the title region 153. As discussed above, the information displayed in the title region 153 may have been extracted from the first broadcast-related information.

Meanwhile, a thumbnail image regarding the broadcast program where the cursor is positioned may be displayed in a thumbnail region 157. In this case, the thumbnail image may have been extracted from the second broadcast-related information.

Meanwhile, as illustrated in FIG. 13, in the second broadcast-related information, information such as contents, a detailed description, and the like, of the broadcast program may be more specific, compared with the first broadcast-related information. Thus, in the generated third broadcast-related information, the information displayed in a contents region 155 may have been extracted from the second broadcast-related information. In detail, the information displayed in the contents region 155 of the third broadcast-related information may include at least one of contents, a genre, a genre image, and a rating included in the second broadcast-related information. Here, the rating may refer to information such as viewer ratings, preference, a viewer age group, and the like.

Meanwhile, as illustrated in FIG. 19, time blocks in units of 30 minutes may be displayed above the broadcast program schedule region 156, and the current time may be displayed in the form of a speech balloon on the left of the time block. In FIG. 19, a case in which time blocks are displayed in units of 30 minutes but the present invention is not limited thereto.

Meanwhile, as illustrated in FIG. 19, all the information regarding terrestrial broadcast programs and cable broadcast programs may be displayed in the broadcast program schedule region 156. In this case, "DTV" may be displayed for the terrestrial broadcast channels and "CATV" may be displayed for the cable broadcast channels. The information regarding the terrestrial broadcast programs and the information regarding the cable broadcast programs may be extracted from the first EPG and the second EPG, respectively.

Meanwhile, the controller 180 may compare the first broadcast-related information and the second broadcast-related information, extract information, which is omitted or insufficient in any one of the first and second broadcast-related information, from the other to generate third broadcast-related information. For example, when contents information of a broadcast program is included in the first broadcast-related information, the controller 180 may extract the contents information included in the first broadcast-related information to generate third broadcast-related information. However, contents information of the broadcast program included in the first broadcast-related information is omitted or has data smaller than the contents information of the broadcast program included in the second broadcast-related information, the controller 180 may extract the contents information of the broadcast program included in the second broadcast-related information to generate third broadcast-related information.

Thus, according to an embodiment of the present invention, since the third broadcast-related information is generated by combining only the advantages of the first EPG and the second EPG, accurate, specific broadcast-related information can be provided.

Figure 20:
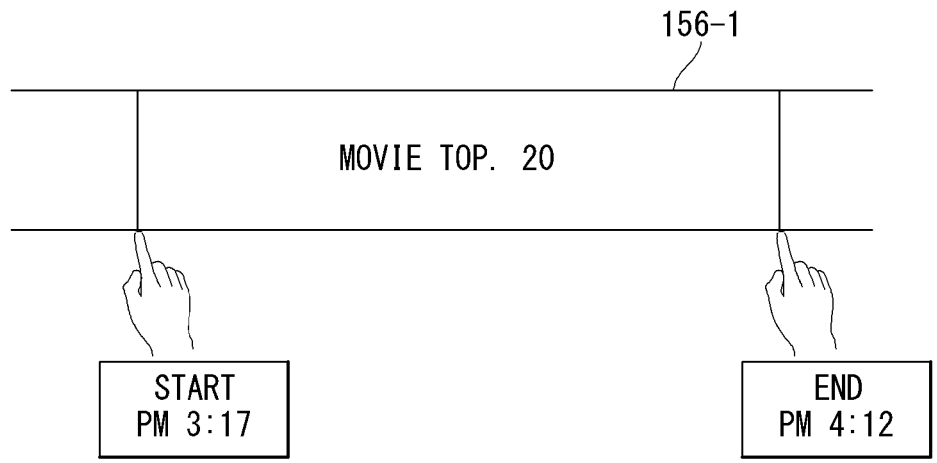
FIG. 20 a view illustrating an example of indicating each broadcast time of broadcast programs according to positions of a cursor in a broadcast receiving device according to another embodiment of the present invention.

FIG. 20 a view illustrating an example of indicating each broadcast time of broadcast programs according to positions of a cursor in a broadcast receiving device according to another embodiment of the present invention.

Referring to FIG. 20, the user may position the cursor in one of the plurality of program blocks included in the broadcast program schedule region. Here, a program block may refer to a region corresponding to a single broadcast program in the broadcast program schedule region 156. As illustrated in FIG. 20, when the user positions the cursor in a front end portion of a particular program block 156-1, the controller 180 may display a start time of the corresponding program in one direction of the cursor. Similarly, when the user positions the cursor in a rear end portion of the particular program block 156-1, the controller 180 may display an end time of the corresponding program in one direction of the cursor.

Thus, the user may recognize the start time or the end time of the particular broadcast program by intuition by using the cursor.

Figure 21:
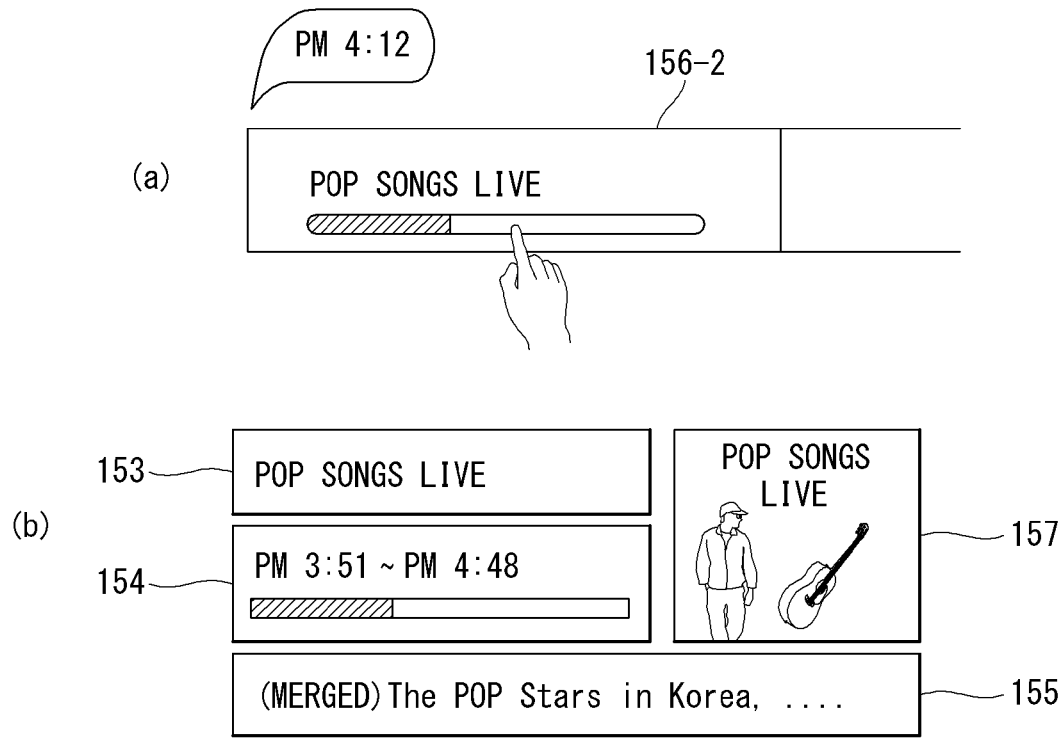
FIG. 21 is a view illustrating various examples of indicating a progress situation of a broadcast program in a broadcast receiving device according to another embodiment of the present invention.

FIG. 21 is a view illustrating various examples of indicating a progress situation of a broadcast program in a broadcast receiving device according to another embodiment of the present invention.

Referring to FIG. 21(a), the user may position the cursor in a program block 156-2 corresponding to a program being currently broadcast. In this case, the controller 180 may display a progressive bar indicating a degree to which the broadcast has progressed in the corresponding program block 156-2. Also, the current time may be displayed in the form of a speech balloon on the left of the corresponding program block 156-2.

Meanwhile, the progressive bar indicating a progressed state of the program being currently broadcast may be displayed in a region other than the program block 156-2. Referring to FIG. 21(b), a title, a broadcast time, a thumbnail image, and contents corresponding to the program block 156-2 where the cursor is positioned may be displayed in the title region 153, the time region 154, the thumbnail region 157, and the contents region 155, respectively. In particular, when the corresponding program is being currently broadcast, the controller 180 may display the progressive bar indicating a degree to which the broadcast has progressed in the time region 154.

Thus, the user may intuitively recognize information regarding the particular broadcast program by using the cursor.

Figure 22:
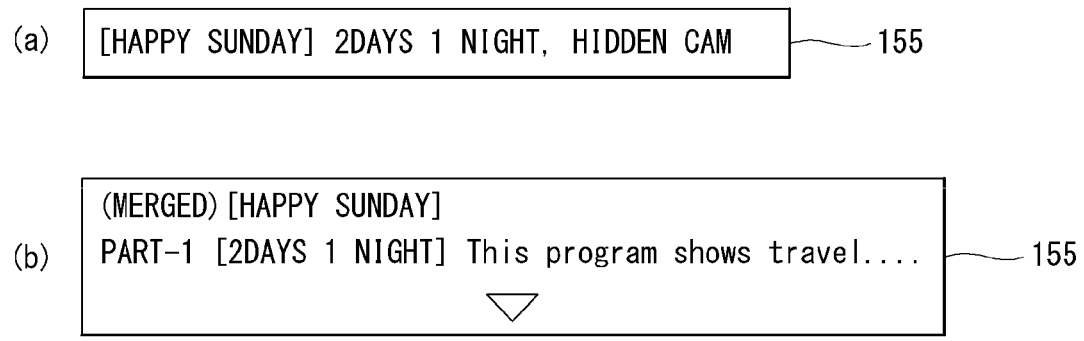
FIG. 22 is a view illustrating an example of contents of a broadcast program displayed by a broadcast receiving device according to another embodiment of the present invention.

FIG. 22 is a view illustrating an example of contents of a broadcast program displayed by a broadcast receiving device according to another embodiment of the present invention.

FIG. 22(a) illustrates contents of a broadcast program included in the first broadcast-related information. As illustrated in FIG. 22(a), a description or contents regarding a broadcast program may be briefly included or may not be provided in the first broadcast-related information.

However, as discussed above, the controller 180 may extract the description or contents of a broadcast program from the second broadcast-related information. Thus, as illustrated in FIG. 22(b), the controller 180 may display a description or contents of a broadcast program included in the second broadcast-related information.

Thus, the user may recognize a detailed description or contents regarding the particular broadcast program.

Figure 23:
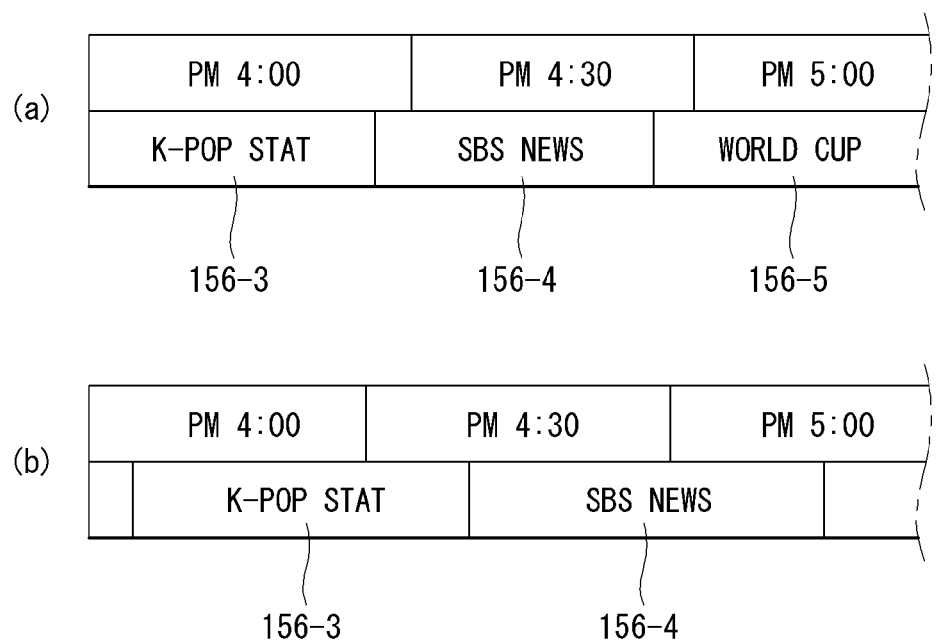
FIG. 23 is a view illustrating various examples of indicating accurate information of broadcast programs in a broadcast receiving device according to another embodiment of the present invention.

FIG. 23 is a view illustrating various examples of indicating accurate information of broadcast programs in a broadcast receiving device according to another embodiment of the present invention. Referring to FIG. 23, a plurality of program blocks 156-3 to 156-5 are formed below the time blocks included in the broadcast program schedule region 156.

FIGS. 23(a) and 23(b) illustrate portions of the broadcast program schedule region 156 based on the second broadcast-related information and the first broadcast-related information, respectively. As discussed above with reference to FIG. 13, the first broadcast-related information may be directly provided from a broadcasting station in real time and may be updated in the broadcasting station in real time. In contrast, the second broadcast-related information is provided from the broadcasting station through an Internet server, an update speed regarding broadcast information may be slow, relative to the first broadcast-related information. Thus, since the controller 180 may display the updated first broadcast-related information, the broadcast program schedule region 156 illustrated in FIG. 23(a) may be changed into that illustrated in FIG. 23(b) so as to be displayed.

Figure 24:
FIG. 24 is a view illustrating an example of setting reserved viewing of a broadcast receiving device according to another embodiment of the present invention.

FIG. 24 is a view illustrating an example of setting reserved viewing of a broadcast receiving device 100 according to another embodiment of the present invention.

In the broadcast receiving device 100 according to another embodiment of the present invention, the controller 180 may reserve outputting of a particular broadcast program based on the third broadcast-related information. In this case, when the current time and a start time of the particular broadcast program included in the third broadcast-related information are identical, the controller 180 may output the particular broadcast program. Also, when the current time and an end time of the particular broadcast program included in the third broadcast-related information are identical, the controller 180 may terminate outputting of the particular broadcast program.

FIG. 24(a) illustrates the third broadcast-related information generated by combining the first broadcast-related information and the second broadcast-related information, and the third broadcast-related information is the same as described above with reference to FIG. 19. Meanwhile, the user may position the cursor in one of the plurality of program blocks included in the broadcast program schedule region and select a particular program block in which the cursor is positioned. In this case a screen for setting reservation for the selected program may be displayed as illustrated in FIG. 24(b).

Referring to FIG. 24(b), a screen 156-6 for setting a reservation for a selected particular program is displayed. In this case, the reservation setting screen 156-6 may be a screen corresponding to the entirety or a portion of the broadcast program schedule region 156. Also, a broadcaster, a broadcast time, broadcast information, and the like, of the selected broadcast program may be displayed on one side of the reservation setting screen 156-6. Also, a reserved viewing button 159-3 and a reservation recording button 159-4 may be displayed on the other side of the reservation setting screen 156-6. The reserved viewing button 159-3 may be used to reserve viewing of the selected broadcast program, and the reservation recording button 159-4 may be used to reserve recording of the selected broadcast program. Thus, in order to reserve and view the selected broadcast program, the user may select the reserved viewing button 159-3, and in this case, the screen illustrated in FIG. 24(c) may be displayed.

In this manner, the user may simply set reserved viewing with respect a particular broadcast program.

Referring to FIG. 24(c), a reserved viewing icon 159-1 may be displayed in the selected broadcast program block. Similarly, when the cursor is positioned in the corresponding broadcast program, the reserved viewing icon 159-1 may be displayed in at least one of the title region 153, the time region 154, the thumbnail region 157, and the contents region 155.

Meanwhile, text indicating that reserved viewing has been completed may be displayed together with an icon, or the like, above the title region 153, the time region 154, and the thumbnail region 157. In this case, the text, icon, or the like, indicating that reserved viewing has been completed may be displayed as an on-screen display (OSD) in one region of the entire screen. Also, unlike the reserved viewing icon 159-1, the text, icon, or the like, indicating that reserved viewing has been completed may be displayed only for a pre-set period of time.

In this manner, the user may intuitively recognize that reserved viewing has been set for a corresponding broadcast program.

FIG. 25 is a view illustrating an example of setting reserved recording of a broadcast receiving device 100 according to another embodiment of the present invention.

In the broadcast receiving device 100 according to another embodiment of the present invention, the controller 180 may reserve recording with respect to a particular broadcast program based on the third broadcast-related information. In this case, when the current time and a start time of the particular broadcast program included in the third broadcast-related information are identical, the controller 180 may record the particular broadcast program and determine at least one storage unit for recording the particular broadcast program among at least one storage unit. Also, when the current time and an end time of the particular broadcast program included in the third broadcast-related information are identical, the controller 180 may terminate recording of the particular broadcast program.

Hereinafter, setting of reserved recording of the broadcast receiving device 100 will be described in succession of the description of FIG. 24. In the state illustrated in FIG. 24(c), the user may select a broadcast program set for reserved viewing, and in this case, the reserved setting screen 156-6 as illustrated in FIG. 25(a) may be displayed.

Referring to FIG. 25(a), a reserved setting screen 156-6 with respect to a selected particular program is displayed. Descriptions of the reserved setting screen 156-6 are the same as those described above with reference to FIG. 24. A reserved viewing cancel button 159-5 and a reserved recording button 159-4 may be displayed on the other side of the reserved setting screen 156-6. The reserved viewing cancel button 159-5 may be used to cancel reserved viewing with respect to a selected broadcast program. Thus, when the reserved viewing cancel button 159-5 is selected, the pre-set reserved viewing setting with respect to the corresponding broadcast program may be released. Also, the reserved recording button 159-4 may be used to reserve recording with respect to the selected broadcast program. Thus, in order to perform reserved recording on the selected broadcast program, the user may select the reserved recording button 159-4, and in this case, a reserved recording setting screen as illustrated in FIG. 25(b) may be displayed.

Referring to FIG. 25(b), a reserved recording setting screen with respect to the selected particular program is displayed. Broadcast information regarding the selected broadcast program may be displayed on one side of the reserved recording setting screen. A menu for selecting the number of broadcast schedule and a menu for selecting a storage device may be displayed on the other side of the reserved recording setting screen. Also, the menu for selecting a storage device may display a remaining capacity of at least one storage device, device information, and the like. Thus, in order to record a selected broadcast program, the user may select an OK button, and in this case, a screen of FIG. 25(c) may be displayed.

In this manner, the user may simply set reserved recording with respect to a particular broadcast program.

Referring to FIG. 25(c), a reserved recording icon 159-2 may be displayed in the selected broadcast program block, and descriptions thereof are the same as those of the reserved viewing icon 159-1 described above with reference to FIG. 24(c). Also, text indicating that reserved recording has been completed may be displayed together with an icon, or the like, and descriptions thereof are also the same as those described above with reference to FIG. 24(c).

In this manner, the user may intuitively recognize that reserved recording with respect to a corresponding broadcast program has been set.

Figure 26:
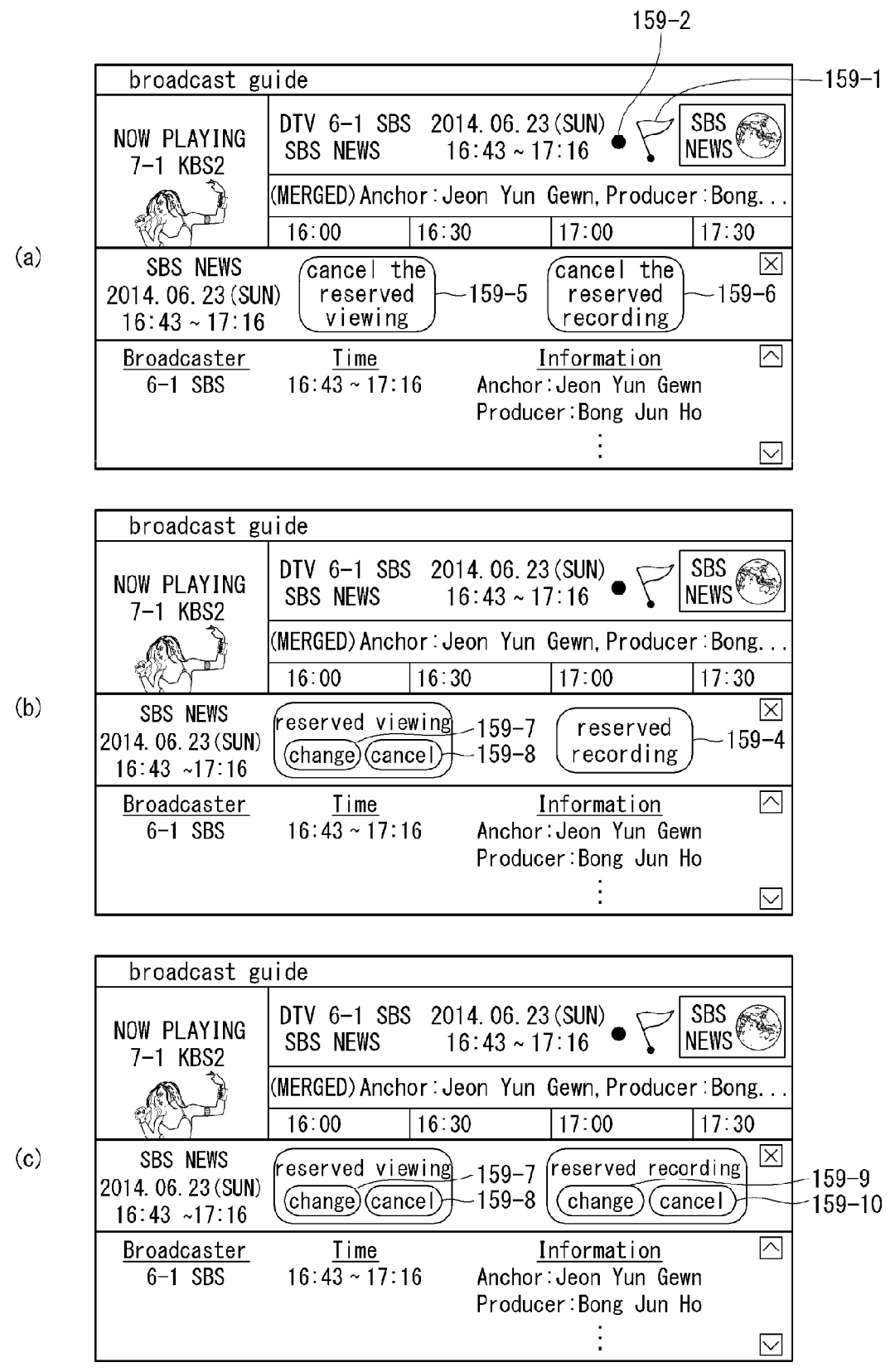

FIG. 26 is a view illustrating an example of canceling or changing reserved viewing or reserved recording of a broadcast receiving device according to another embodiment of the present invention.

In the state illustrated in FIG. 25(c), the user may select a broadcast program set for reserved viewing and reserved recording, and in this case, the screen illustrated in FIG. 26(a) may be displayed. Referring to FIG. 26(a), the reserved viewing cancel button 159-5 and the reserved recording cancel button 159-6 are displayed, respectively. When the user wants to cancel the reserved viewing, the user may select the reserved viewing cancel button 159-5 to cancel the pre-set reserved viewing.

Meanwhile, the user may change or cancel the pre-set reserved viewing.

In a state in which only reserved viewing is set for a particular broadcast program, the user may select the broadcast program set for reserved viewing, and in this case, a screen illustrated in FIG. 26(b) may be displayed. Referring to FIG. 26(b), a reserved viewing change button 159-7 for changing pre-set reserved viewing with respect to a selected broadcast program or a reserved viewing cancel button 159-8 for canceling a pre-set reserved viewing with respect to a selected broadcast program is displayed. Thus, when the reserved viewing change button 159-7 is selected, the screen illustrated in FIG. 24(a) may be displayed. In this case, a message indicating that the reserved viewing has been changed or canceled may be displayed in one region of the entire screen for a pre-set period of time.

In a state in which reserved viewing and reserved recording is set for a particular broadcast program, the user may select a corresponding broadcast program, and in this case, a screen illustrated in FIG. 26(c) may be displayed. Referring to FIG. 26(c), the reserved viewing change button 159-7 for changing pre-set reserved viewing with respect to a selected broadcast program or the reserved viewing cancel button 159-8 for canceling pre-set reserved viewing with respect to a selected broadcast program is displayed. Also, a reserved recording change button 159-9 for changing pre-set reserved recording with respect to a selected broadcast program or a reserved recording cancel button 159-10 for canceling pre-set reserved recording with respect to a selected broadcast program is displayed. Accordingly, when the reserved recording change button 159-9 is selected, the screen illustrated in FIG. 25(b) may be displayed, and when the reserved recording cancel button 159-10 is selected, the screen illustrated in FIG. 24(c) may be displayed. In this case, a message indicating that the reserved viewing has been changed or canceled may be displayed in one region of the entire screen for a pre-set period of time.

In this manner, the user may easily change or cancel pre-set reserved viewing or pre-set reserved recording with respect to a corresponding broadcast program.

Figure 27:
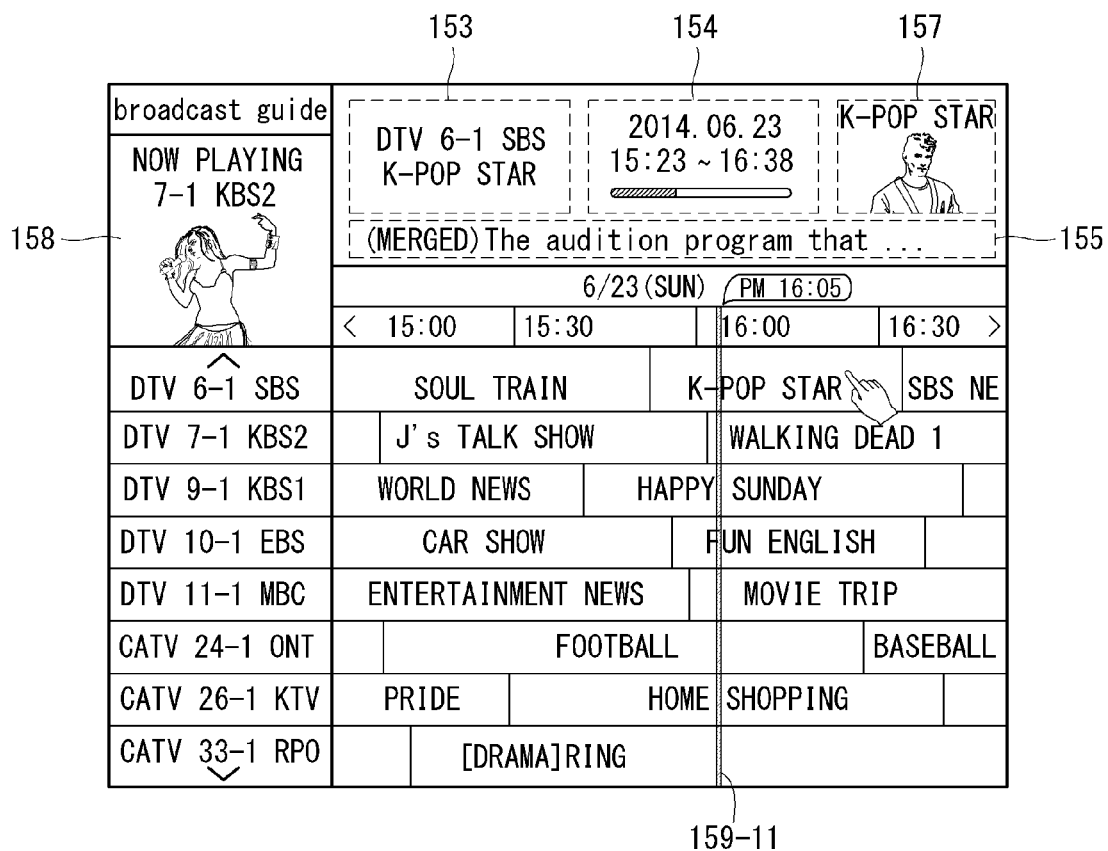
FIG. 27 is a view illustrating an example of a broadcast program schedule over the current time of a broadcast receiving device according to another embodiment of the present invention.

FIG. 27 is a view illustrating an example of a broadcast program schedule over the current time of a broadcast receiving device 100 according to another embodiment of the present invention.

In the broadcast receiving device 100 according to another embodiment of the present invention, the controller 180 may output an indication bar 159-11 for indicating the current time in the broadcast program schedule based on the third broadcast-related information.

Referring to FIG. 27, the third broadcast-related information generated by combining the first broadcast-related information and the second broadcast-related information is displayed. In this case, the controller 180 may move the broadcast program schedule displayed on the screen.

In detail, in the screen state illustrated in FIG. 19, the user may select a left movement button by a desired amount or may touch-and-drag the cursor in a rightward direction. Accordingly, a portion or the entirety of the broadcast program schedule with respect to a program which has been already broadcast before based on the current time may be displayed.

In this case, as illustrated in FIG. 27, the indication bar 159-11 indicating the current time may be displayed in the broadcast program schedule region. Thus, the broadcast program schedule regarding already broadcast programs are displayed on the left side of the indication bar 159-11 and a broadcast program schedule regarding programs to be broadcast may be displayed on the right side of the indication bar 159-11.

The method for controlling a broadcast receiving device according to an embodiment of the present invention may be implemented in the form of a program command that may be performed through various computer units and recorded in a computer-readable medium. The computer-readable recording medium may include a program command, a data file, a data structure, and the like, alone or in a form of a combination thereof. A program command recorded in the medium may be particularly designed or configured for the present invention or may be known to be used by a computer software person in the art.

Examples of the computer-readable recording medium include a hardware device particularly configured to store and perform a program command, such as a magnetic medium such as a hard disk, a floppy disk, or a magnetic tape, an optical medium such as a CD-ROM or a DVD, a magneto-optical medium such as a floptical disk, and a ROM, a RAM, a flash data storage unit, or the like. Examples of program commands include high level language codes that may be executed by a computer using an interpreter, or the like, as well as mechanical language codes created by a compiler. The hardware device may be configured to operate by one or more software modules to perform processing according to an exemplary embodiment of the present disclosure, and vice versa.

Hereinabove, although the present invention is described by specific matters, exemplary embodiments, and drawings, the present invention is not limited to the exemplary embodiments and various modifications and changes may be made by those skilled in the art to which the present invention pertains from this description.

Therefore, the spirit of the present invention should not be limited to the above-described embodiments, and the following claims as well as all modified equally or equivalently to the claims are intended to fall within the scope and spirit of the invention.

What is claimed is:

1. A broadcast receiving device comprising:
a display unit;
a communication unit; and
a controller to:
receive, through the communication unit, a first electronic program guide (EPG) via a broadcasting network and a second EPG via the Internet,
display broadcast information on the display unit, the broadcast information including a first broadcast information from the first EPG and a second broadcast information from the second EPG,
combine the first broadcast information and the second broadcast information when a similarity between a title of the first program and a title of the second program is greater than a predetermined reference,
generate a combined broadcast information, and
display an updated time information in real time when the first broadcast information is updated, the combined broadcast information,
wherein the controller is further configured to determine whether the first broadcast information collides with the second broadcast information, identify a priority between the first broadcast information and the second broadcast information when the first broadcast information collides with the second broadcast information, and combine the first broadcast information and the second broadcast information based on the priority.

2. The device of claim 1, wherein the controller compares a predetermined set of bytes of a character string of a first program title included in the first broadcast information and a character string of a second program title included in the second broadcast information to determine whether the second broadcast information is to be combined with the first broadcast information.

3. The device of claim 2, wherein the controller determines the second broadcast information to potentially be combined with the first broadcast information, when the character string of the first title and the character string of the second title are identical for the first time.

4. The device of claim 2, wherein the controller determines the similarity between the first program and the second program title, wherein the similarity is calculated as follows:

$$\text{Similarity} = \frac{(\text{Number of bytes of same character string}) \times 2}{(\text{length of first character string}) + (\text{length of second character string})}$$

5. The device of claim 4, wherein when the program title similarity is 0.4 or greater, the controller determines that the second broadcast information is to be combined with the first broadcast information.

6. The device of claim 1, wherein the controller determines the second broadcast information to potentially be combined with the first broadcast information depending on a time difference between a start time and an end time of a broadcast program included in the first broadcast information and a start time and an end time of a broadcast program included in the second broadcast information, wherein the time difference is determined as follows:

Time difference=|(first start time)−(second start time)|+|(first end time)−(second end time)|

7. The device of claim 6, wherein the controller determines the second broadcast information including a start time and an end time of a broadcast program having a minimum time difference with respect to a start time and an end time of the broadcast program included in the first broadcast information to be included in the broadcast information.

8. The device of claim 1, wherein the broadcast information includes at least one of a start time, an end time, a broadcast time, a title, a subtitle, contents, and a channel name of the broadcast program included in the first broadcast information, and at least one of a genre, a genre image, a rating, and a thumbnail of the broadcast program included in the second broadcast information.

9. The device of claim 1, wherein the broadcast information includes at least one of contents and a channel name of the broadcast program included in the second broadcast information.

10. The device of claim 1, wherein the controller formats the first and second broadcast information into databases having different data structures and storing the same.

11. The device of claim 1, wherein the controller formats the broadcast information obtained by combining the first and second broadcast information into a database structure and storing the same.

12. The device of claim 1, wherein the controller reserves outputting of a particular broadcast program based on the broadcast information.

13. The device of claim 12, wherein the controller outputs the particular broadcast program when the current time and a start time of the particular broadcast program included in the broadcast information are identical.

14. The device of claim 13, wherein the controller terminates outputting of the particular broadcast program when the current time and an end time of the particular broadcast program included in the broadcast information are identical.

15. The device of claim 1, wherein the controller reserves recording of the particular broadcast program based on the broadcast information.

16. The device of claim 15, wherein the controller records the particular broadcast program, when the current time and the start time of the particular broadcast program are identical.

17. The device of claim 16 wherein the controller terminates recording of the particular broadcast program, when the current time and the end time of the particular broadcast program included in the broadcast information are identical.

18. The device of claim 15, wherein the controller determines a storage unit in which the particular broadcast program is to be recorded, among at least one storage unit.

19. The device of claim 1, wherein the controller displays, on the display unit, an indication bar indicating the current time to a broadcast program schedule based on the broadcast information.

* * * * *